D. W. SHIEK.
CALCULATING AND LISTING MACHINE.
APPLICATION FILED AUG. 5, 1908.
1,143,448.
Patented June 15, 1915.
17 SHEETS—SHEET 1.
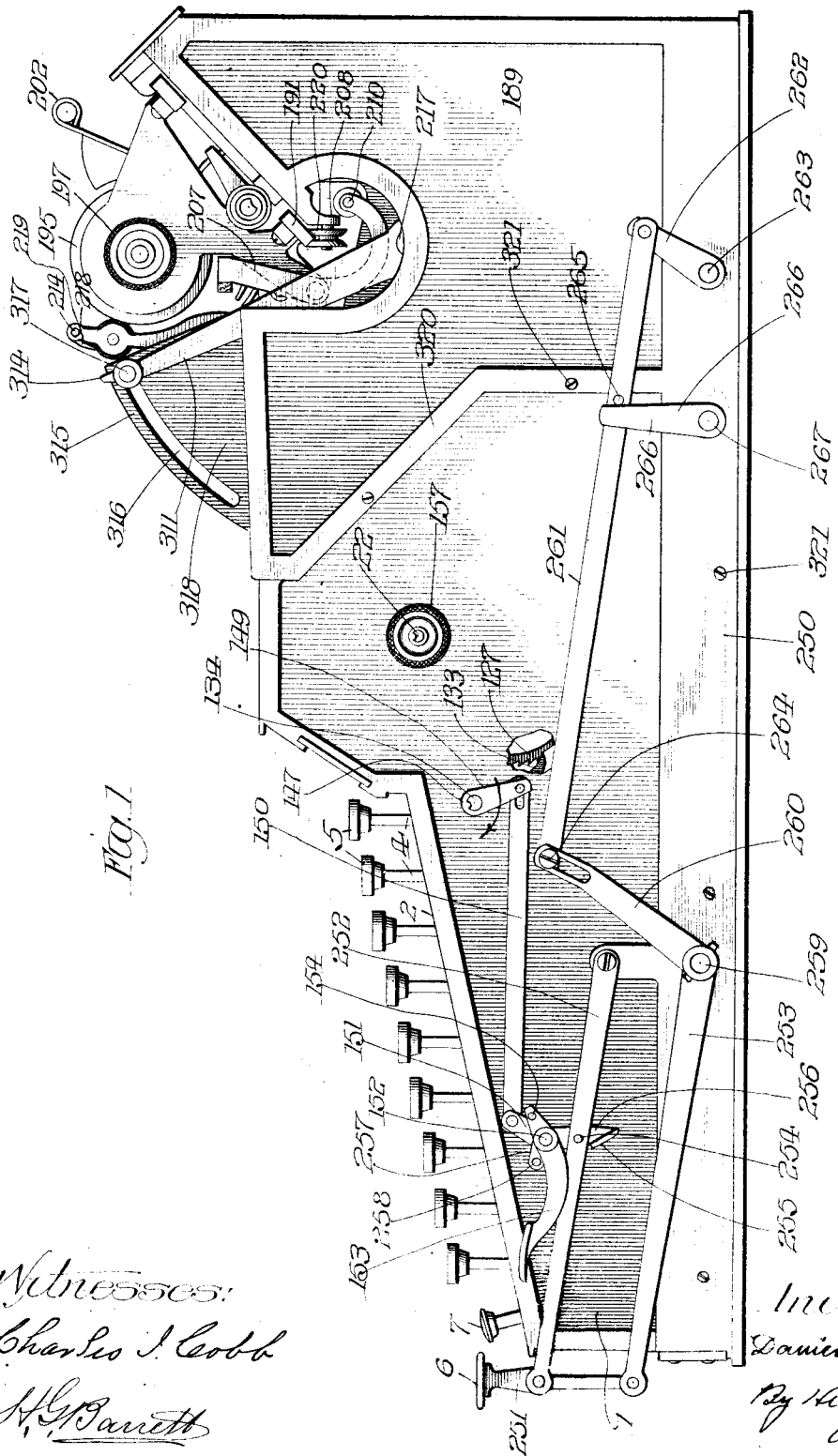

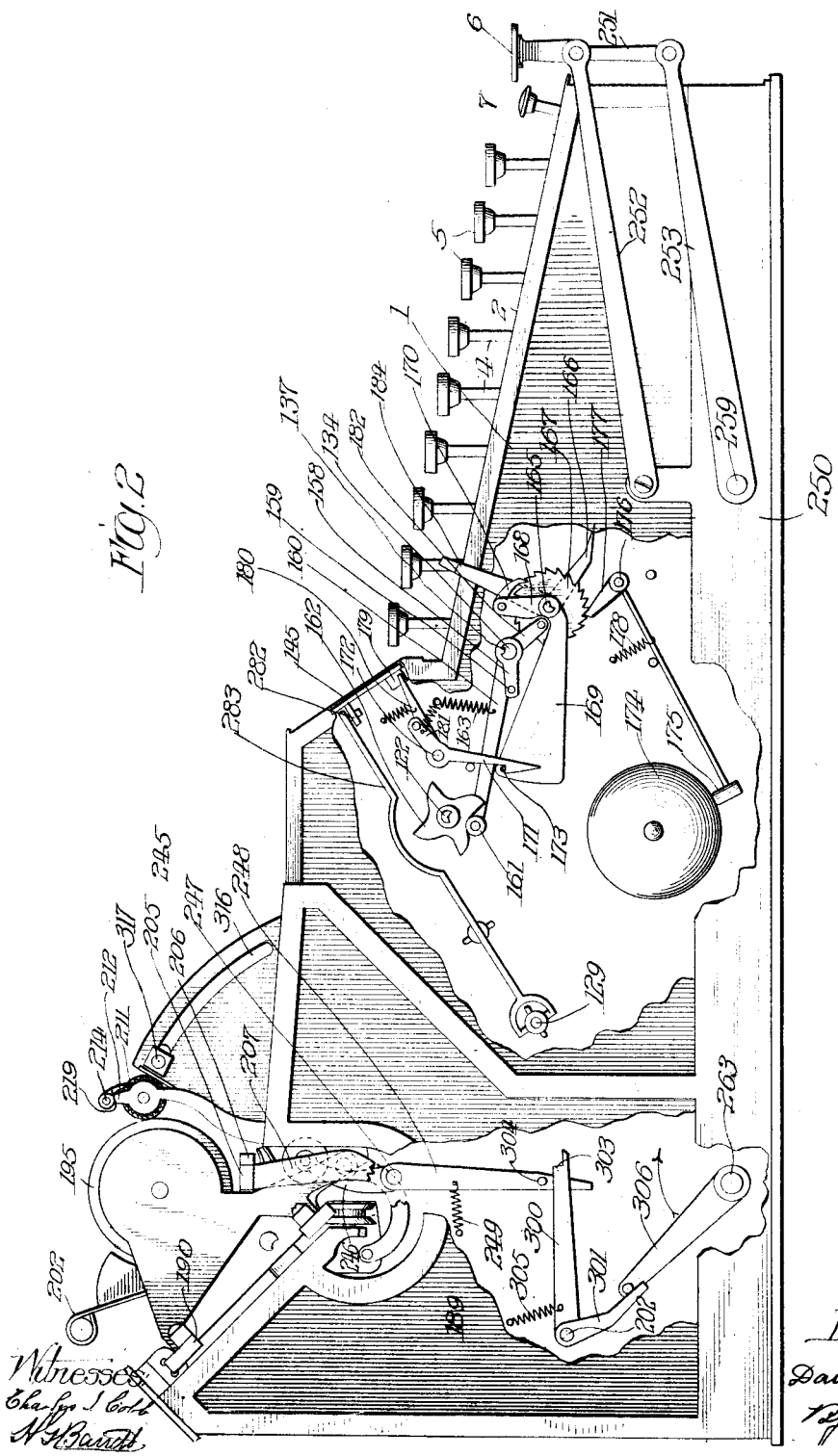

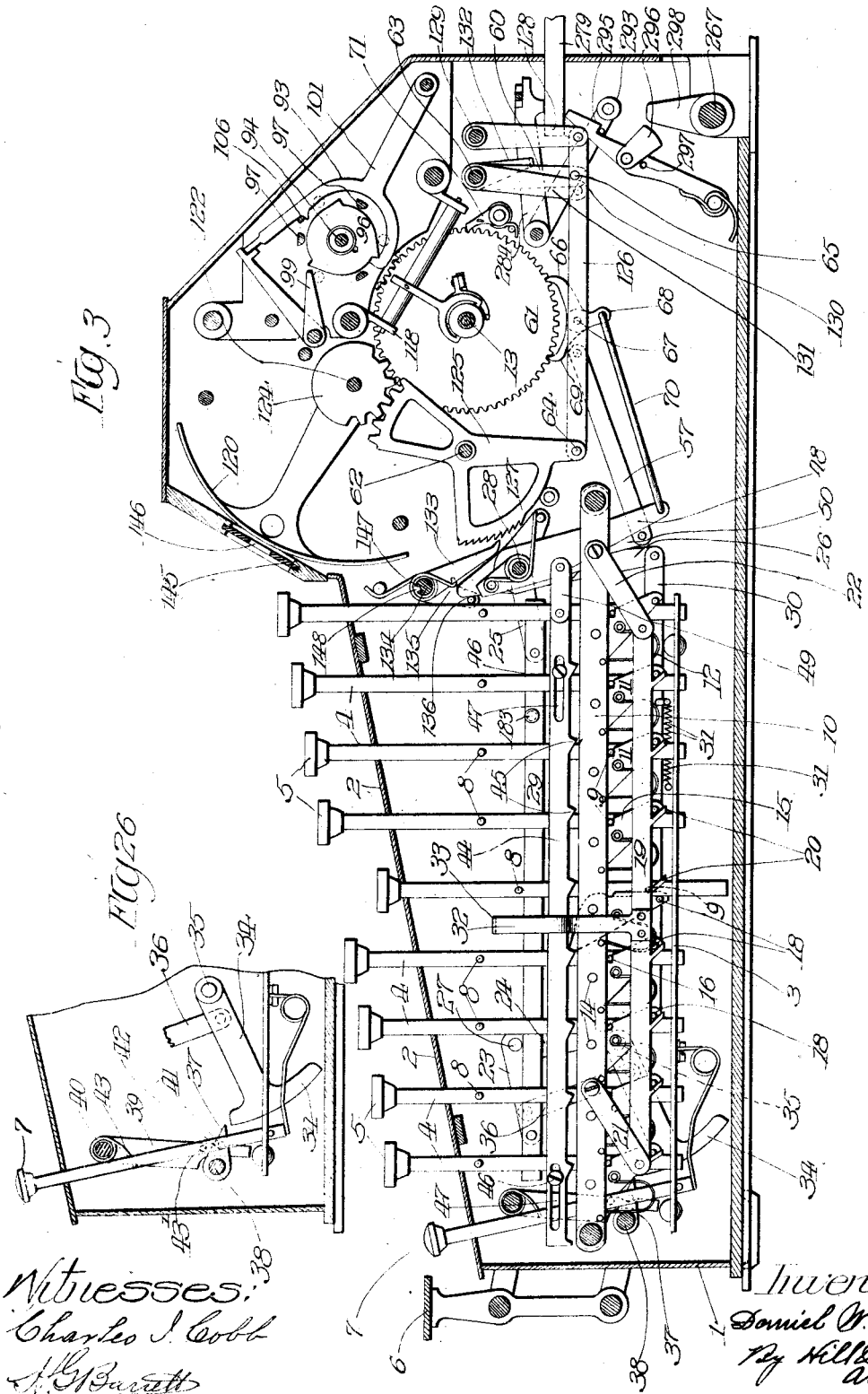

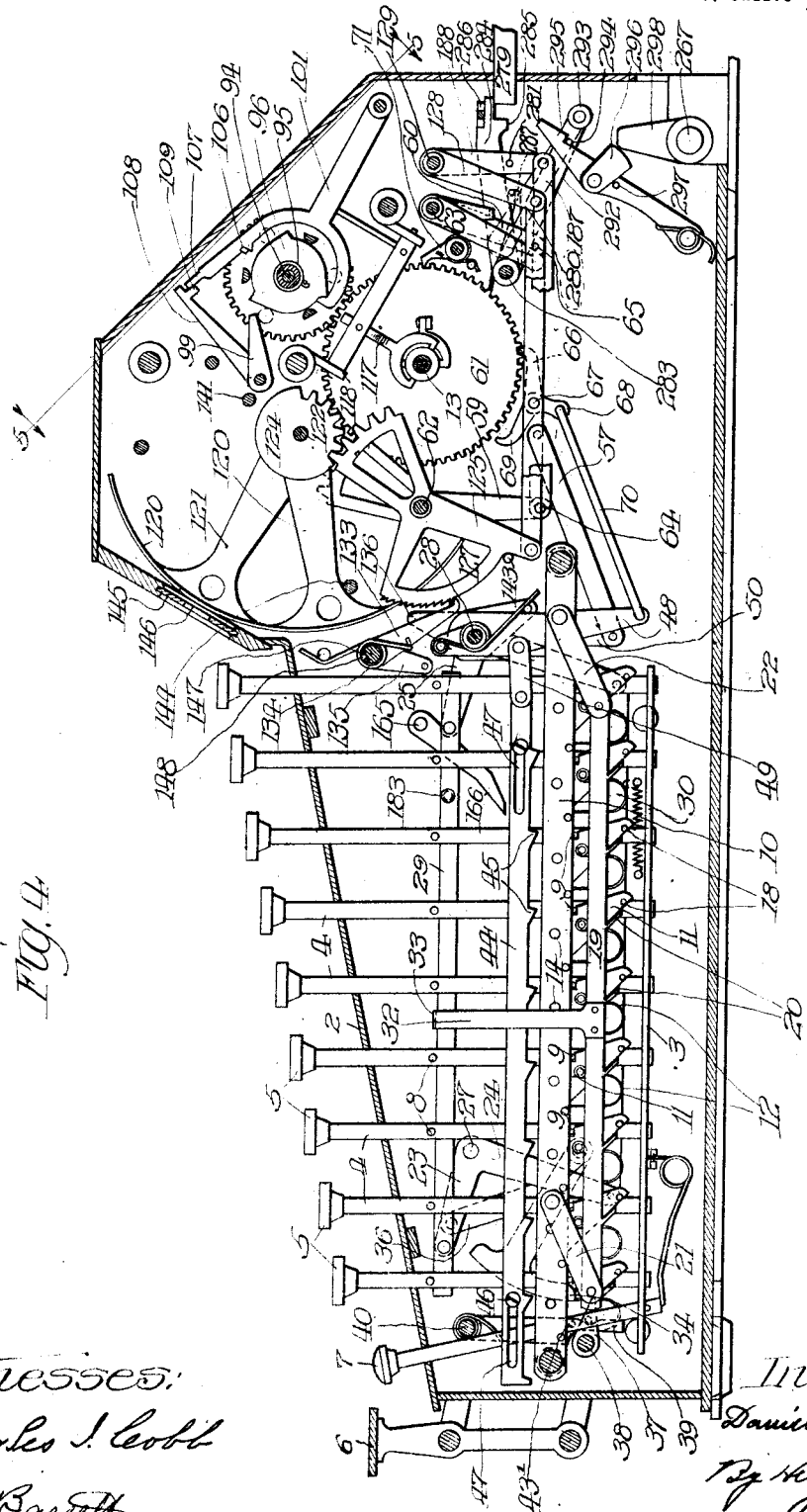

D. W. SHIEK.
CALCULATING AND LISTING MACHINE.
APPLICATION FILED AUG. 5, 1908.

1,143,448.

Patented June 15, 1915.
17 SHEETS—SHEET 5.

Witnesses:
Charles J. Cobb
H. G. Barritt

Inventor:
Daniel W. Shiek
By Hill & Hill
Attys.

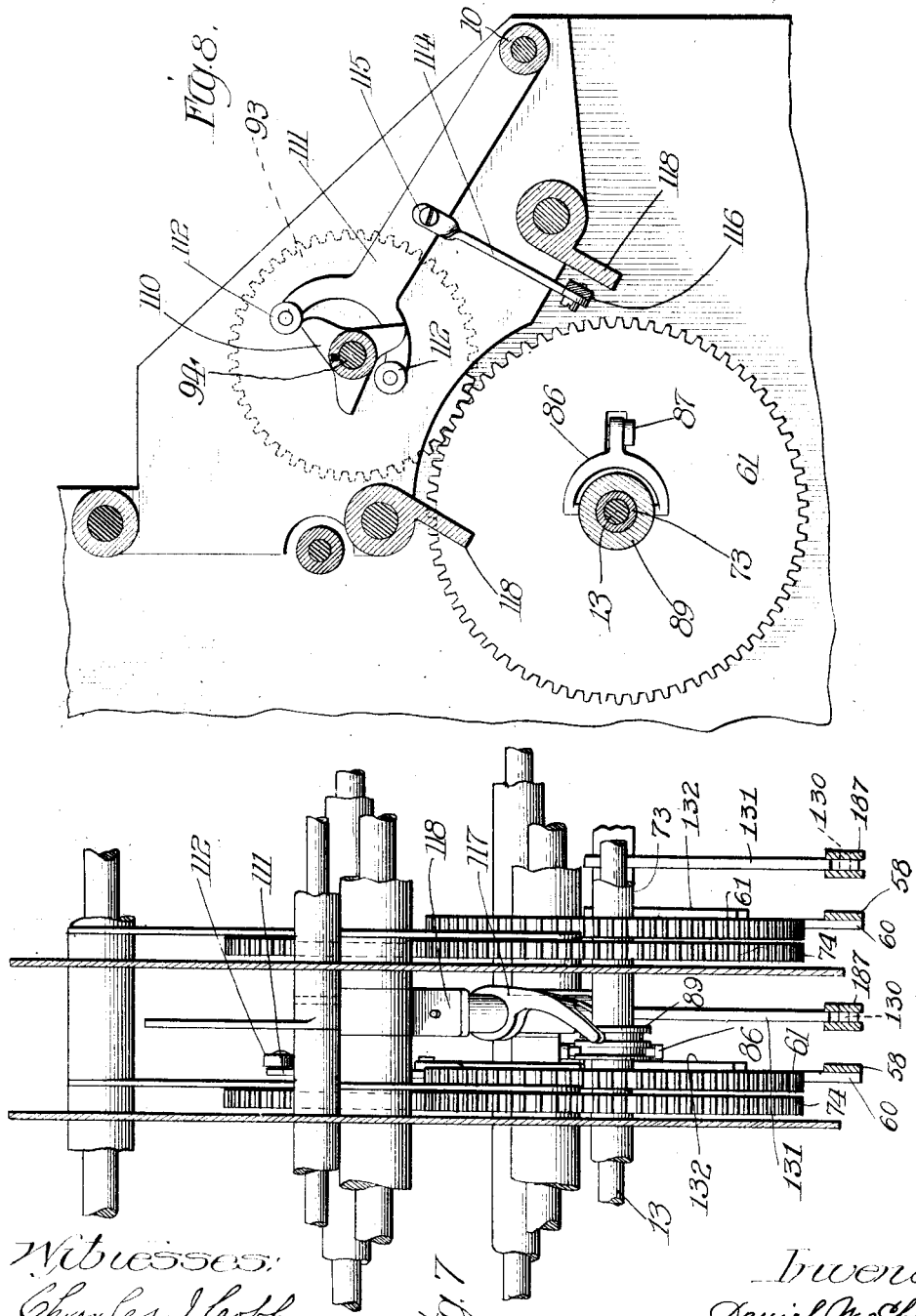

D. W. SHIEK.
CALCULATING AND LISTING MACHINE.
APPLICATION FILED AUG. 5, 1908.

1,143,448.

Patented June 15, 1915.
17 SHEETS—SHEET 7.

Witnesses:
Charles J. Cobb
N. G. Barrett

Inventor:
Daniel W. Shiek
By Hill & Hill
Attys.

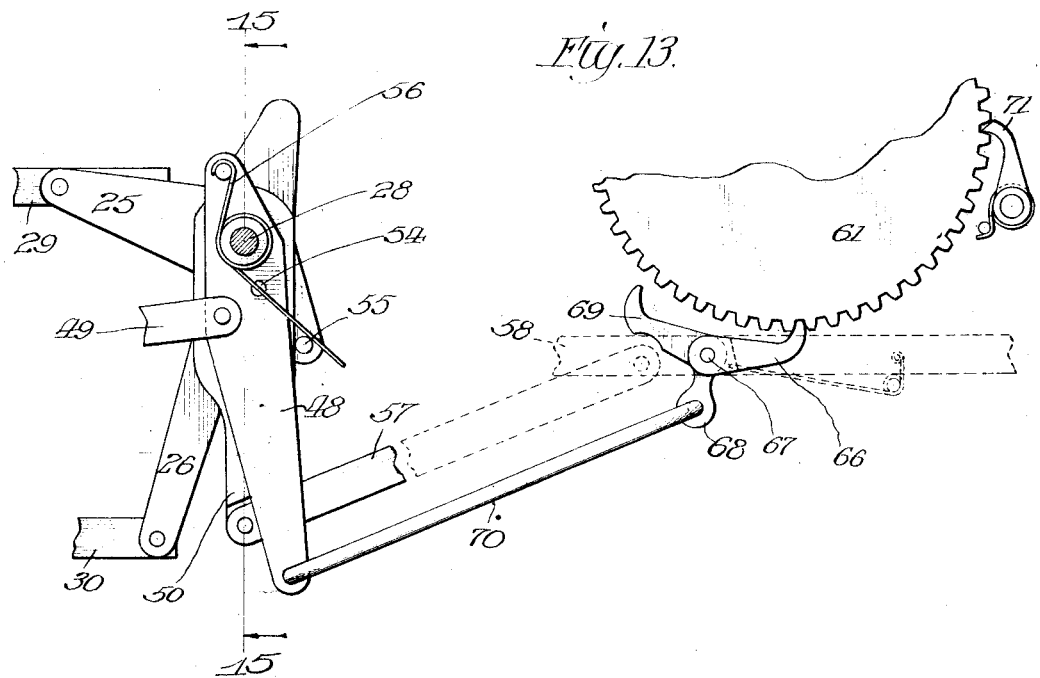
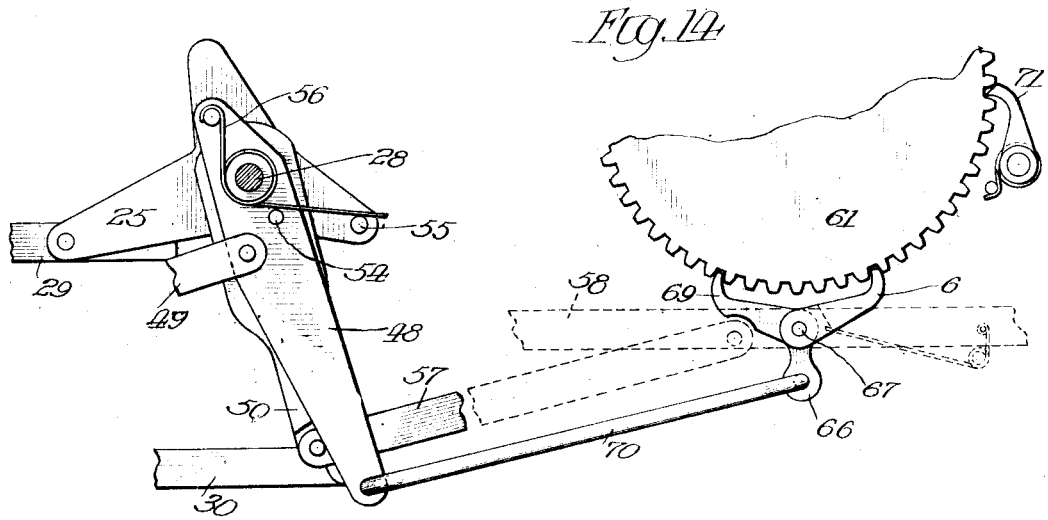

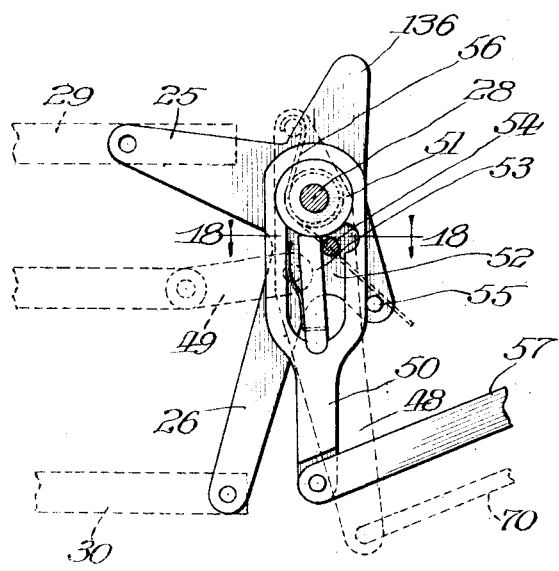
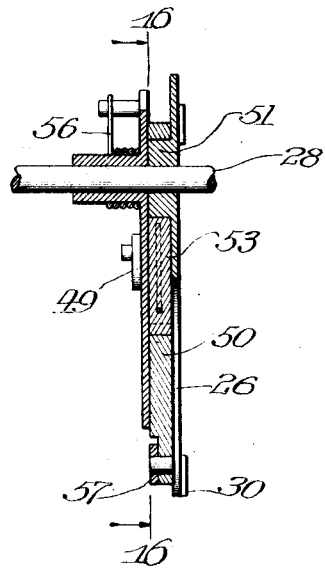
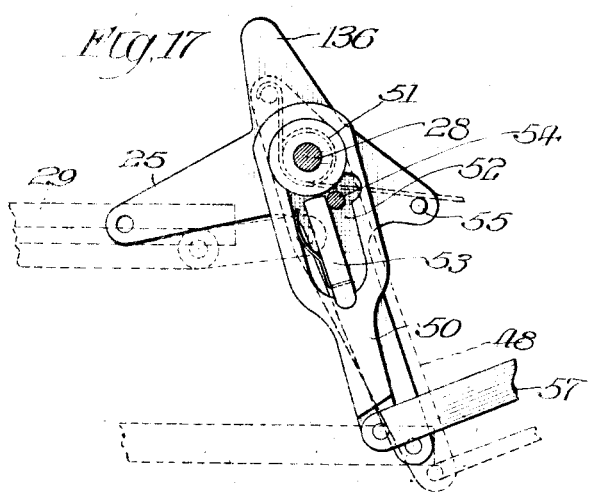
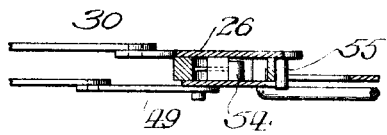

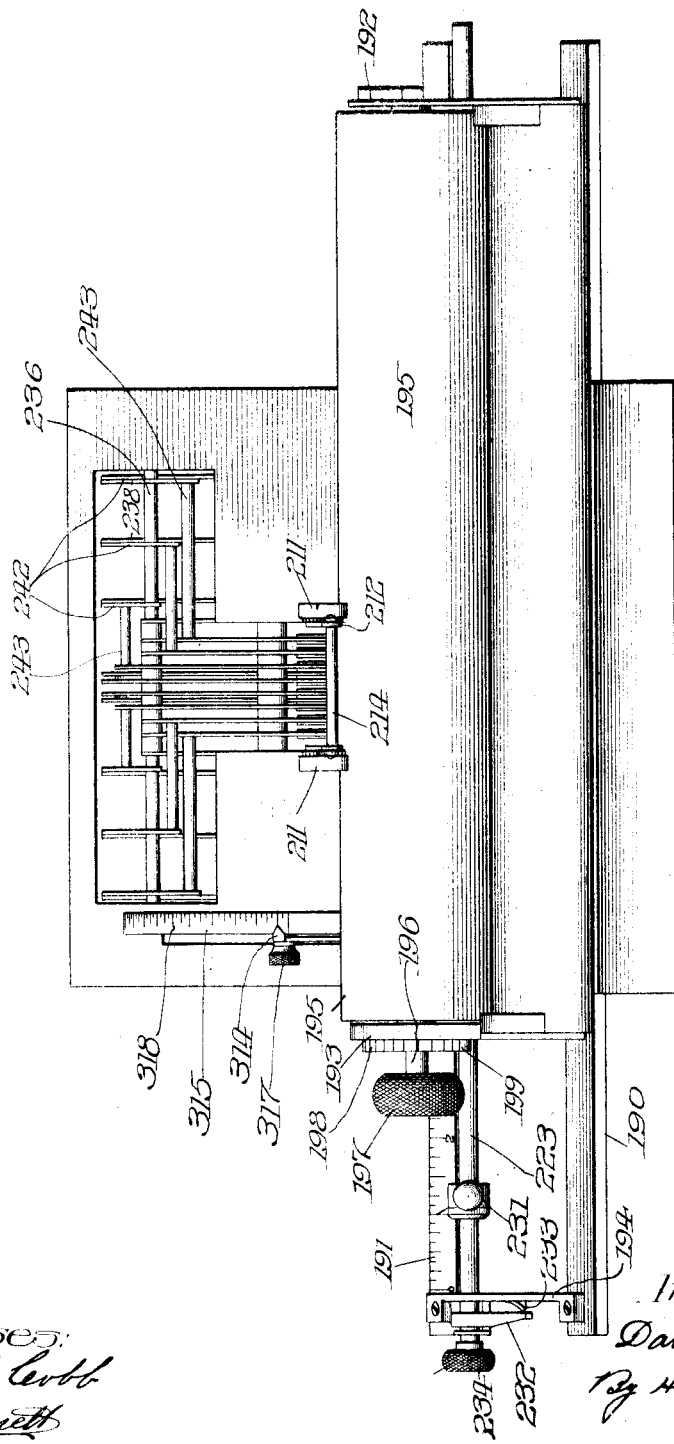

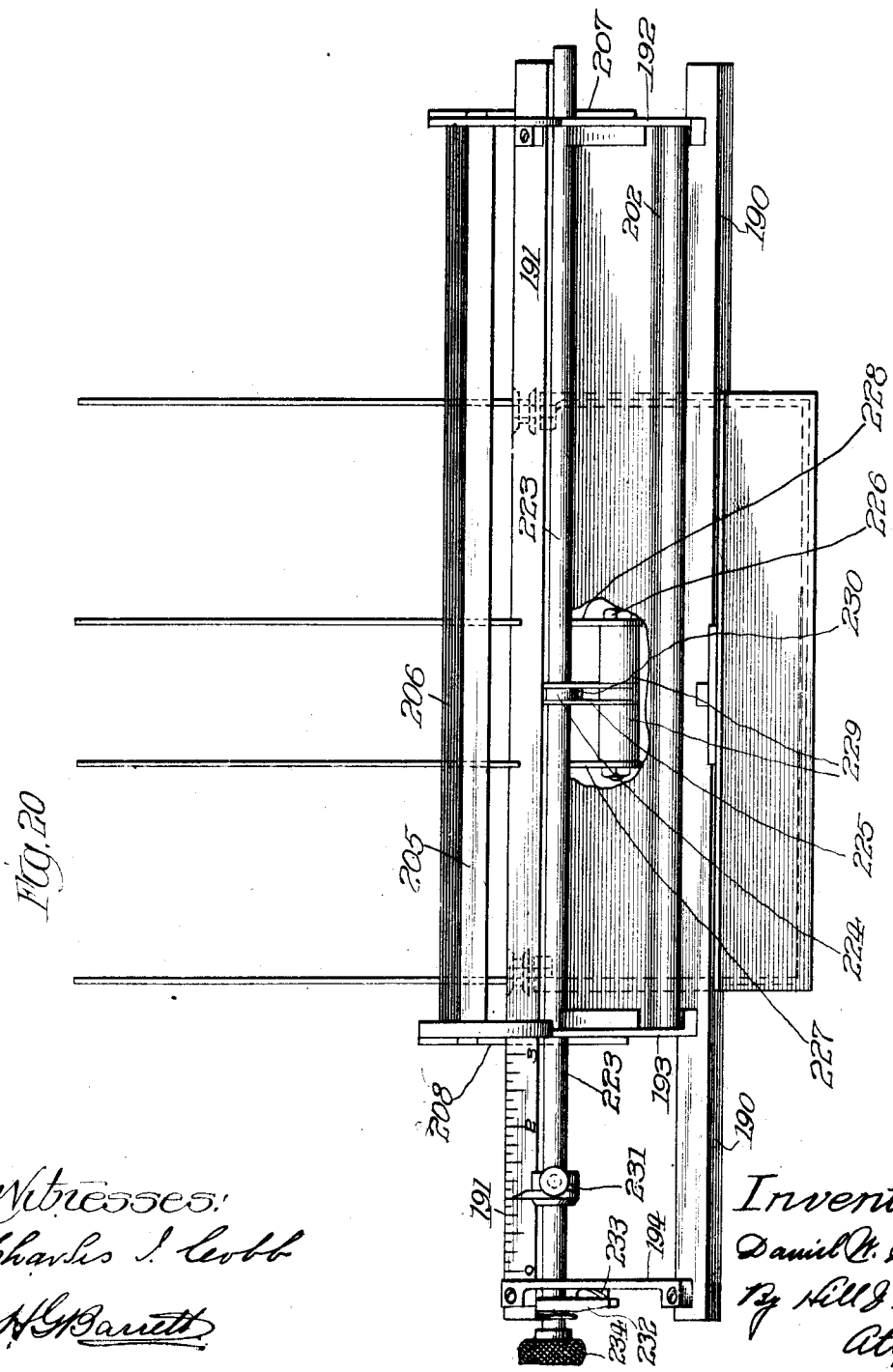

D. W. SHIEK.
CALCULATING AND LISTING MACHINE.
APPLICATION FILED AUG. 5, 1908.
1,143,448.
Patented June 15, 1915.
17 SHEETS—SHEET 12.
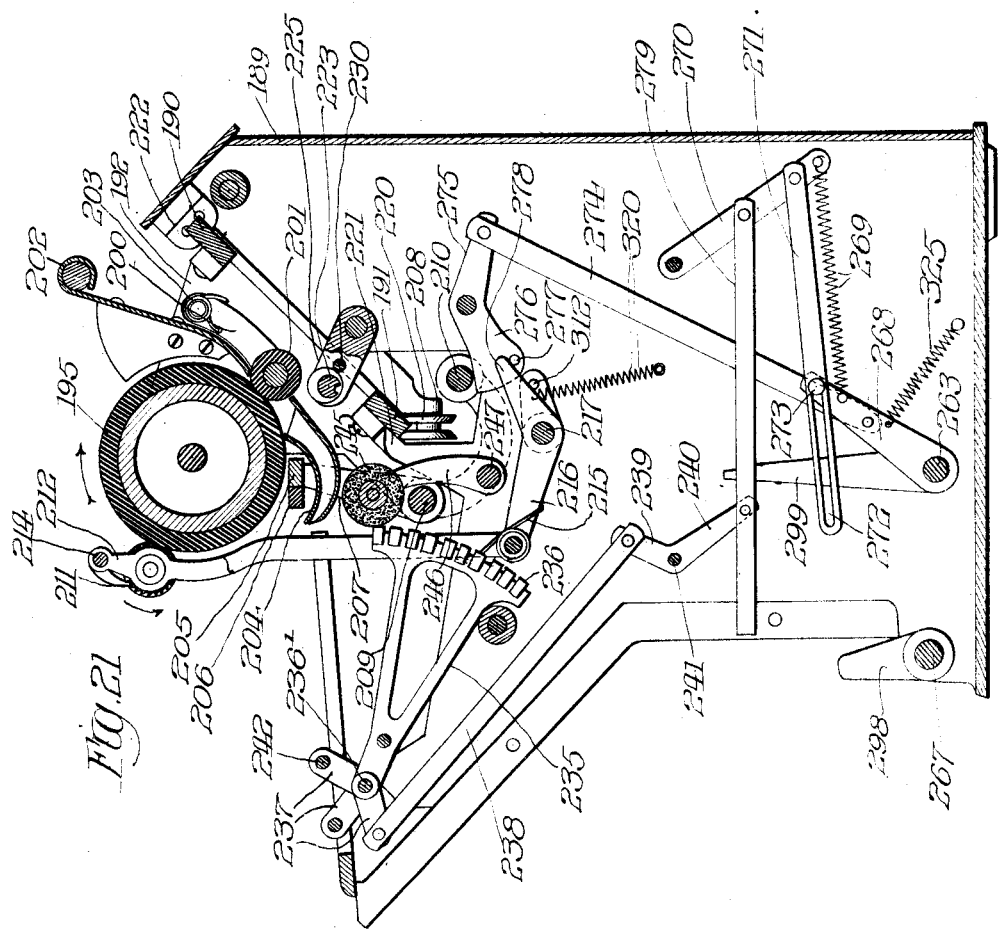

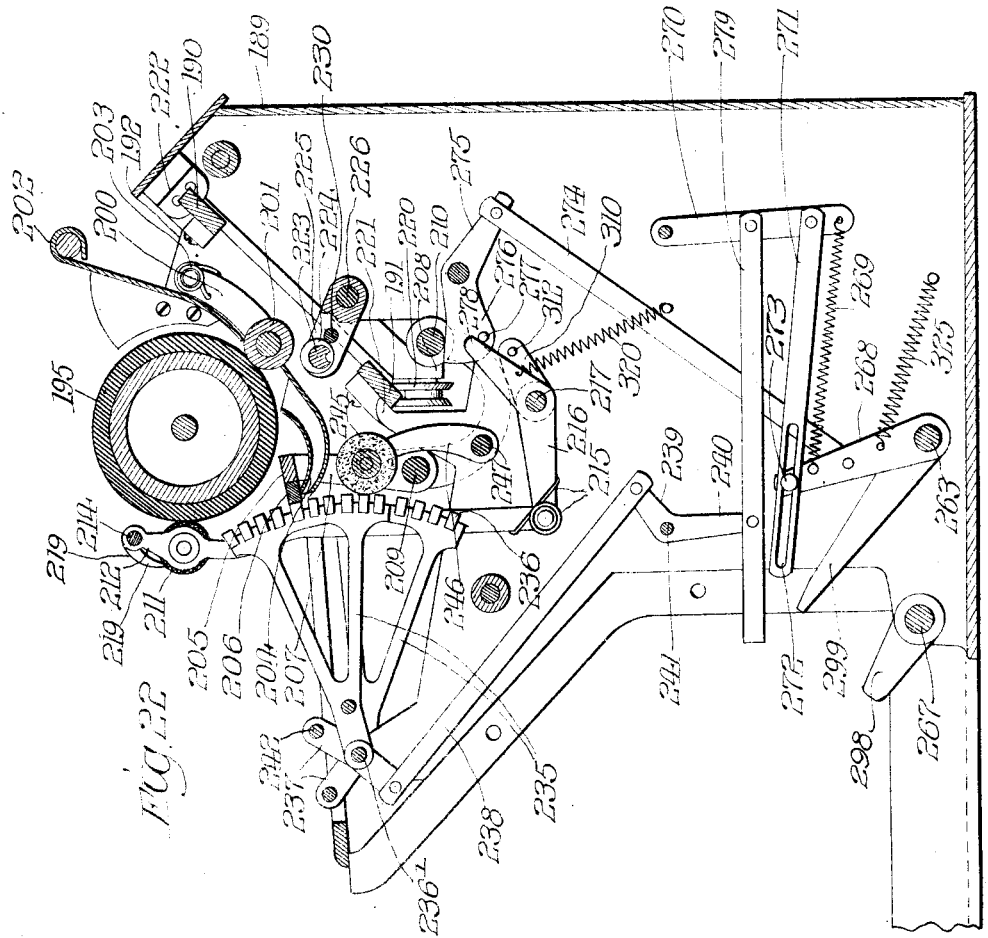

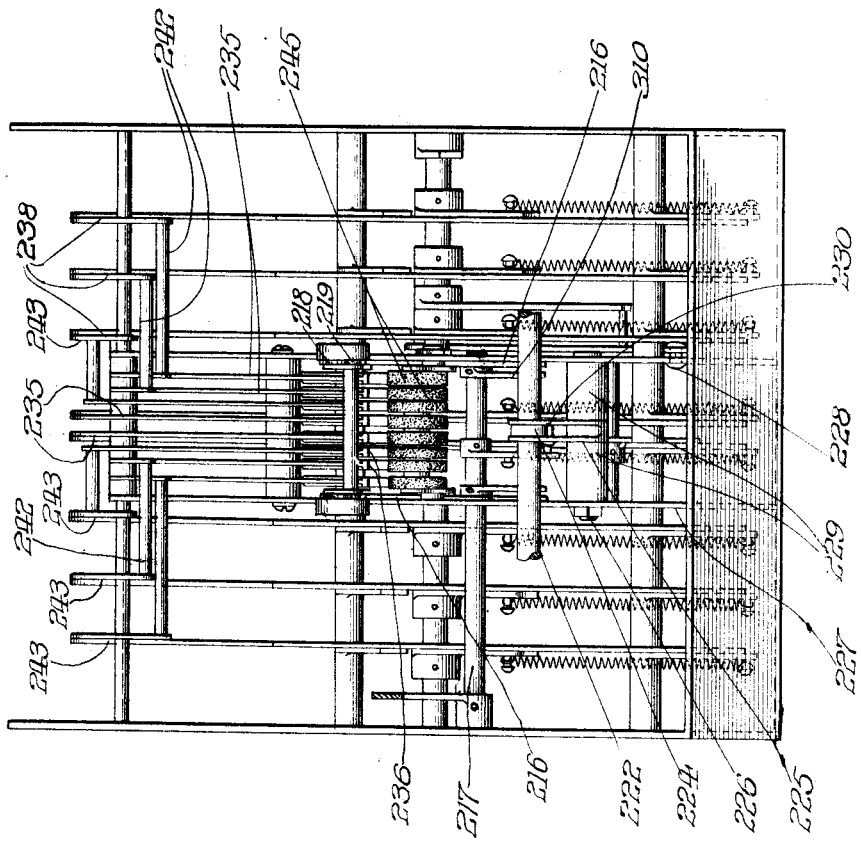

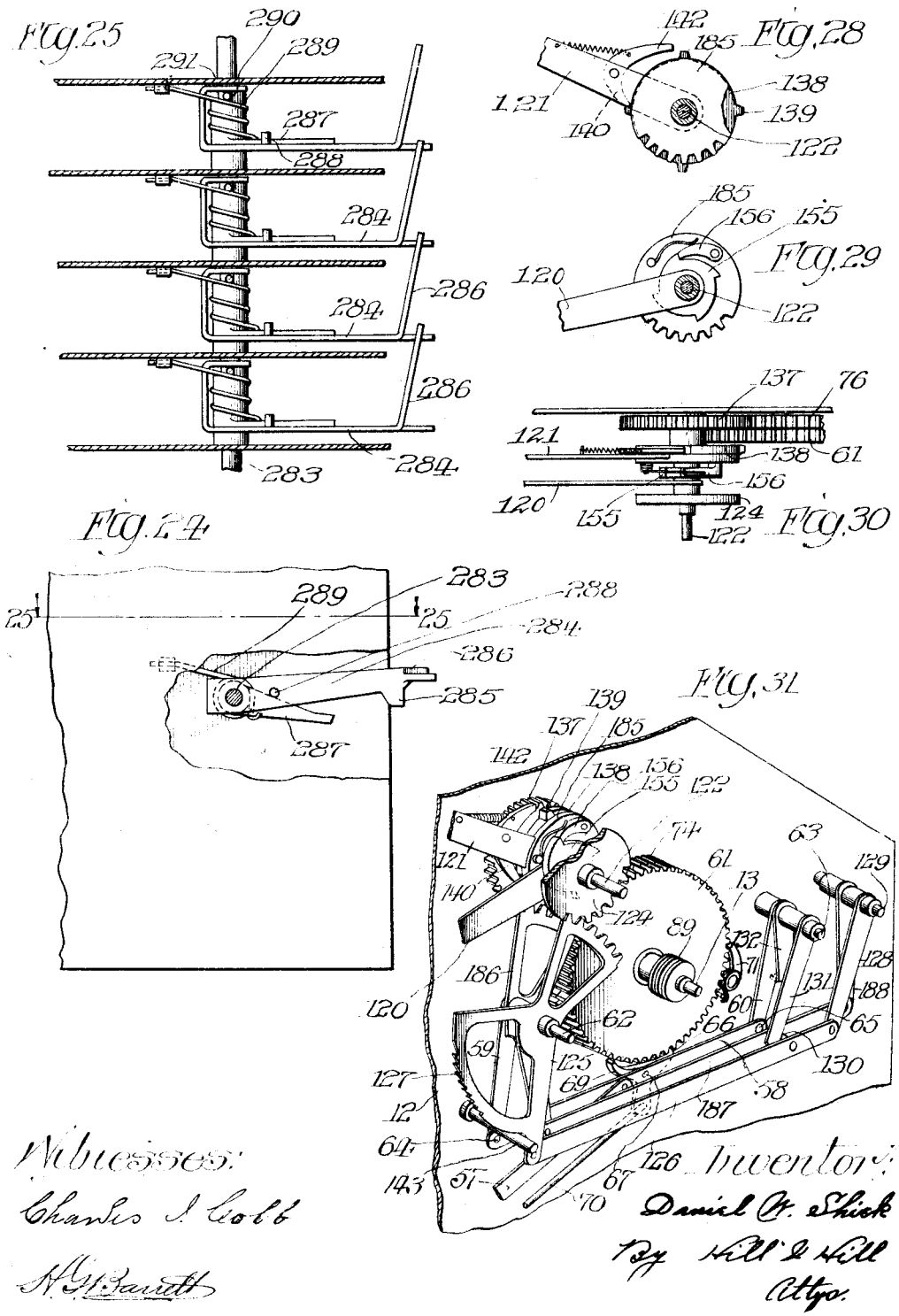

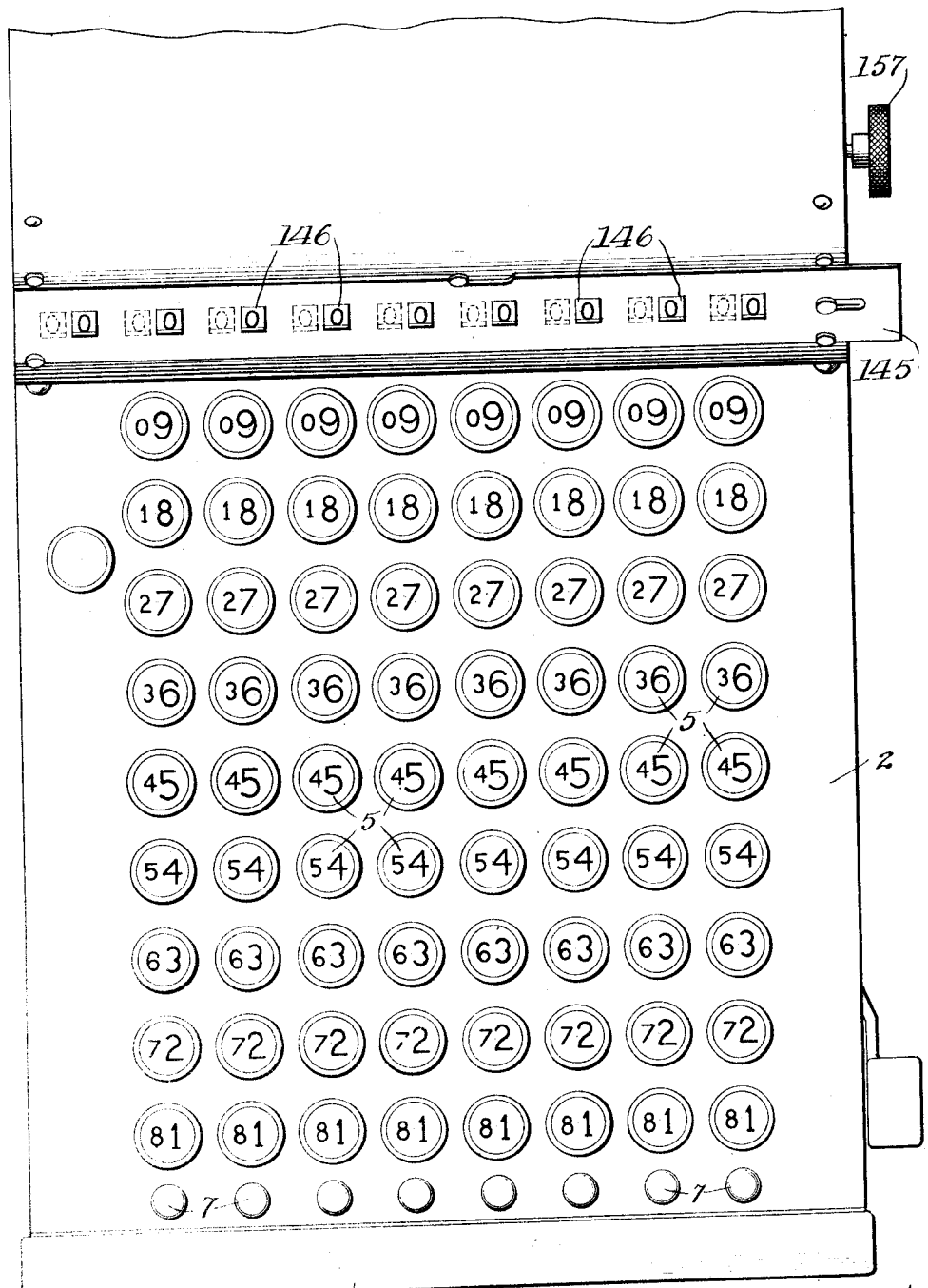

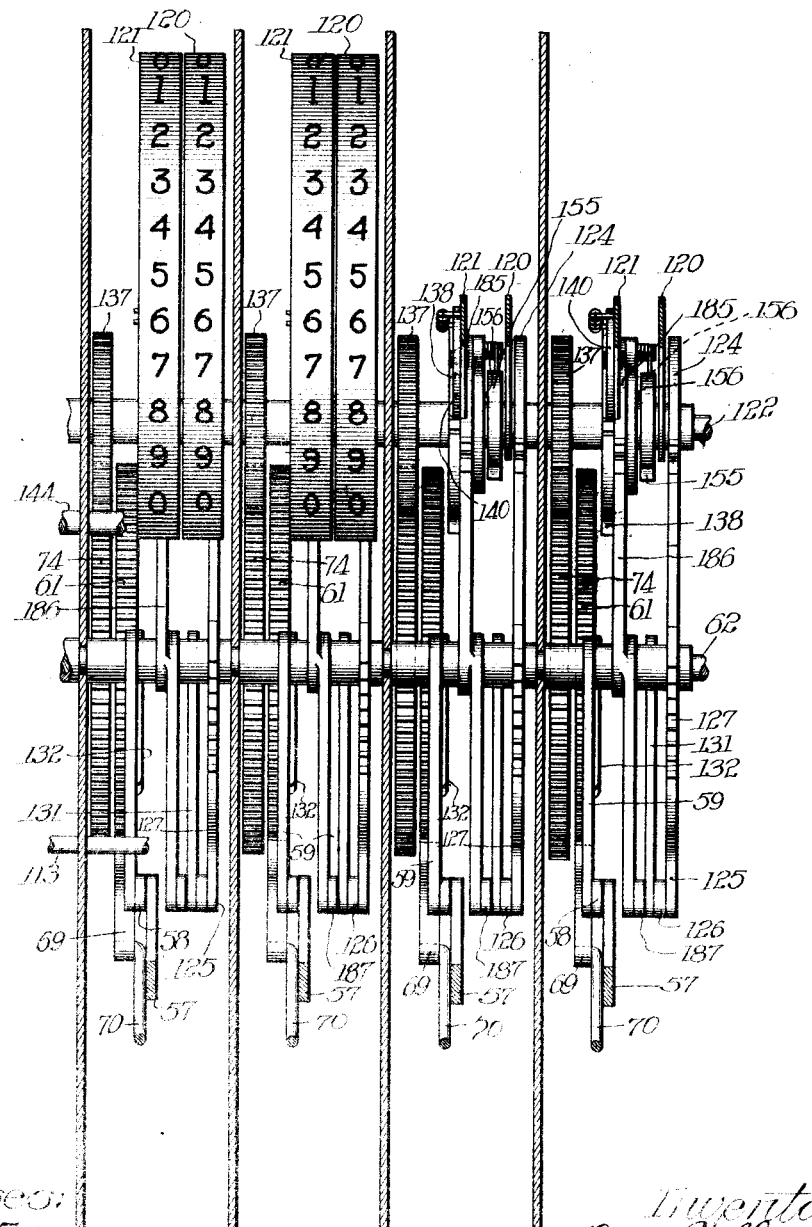

UNITED STATES PATENT OFFICE.

DANIEL W. SHIEK, OF INDIANAPOLIS, INDIANA, ASSIGNOR TO WALTER L. MILLIKEN, OF BARNSTABLE, MASSACHUSETTS.

CALCULATING AND LISTING MACHINE.

1,143,448.     Specification of Letters Patent.     Patented June 15, 1915.

Application filed August 5, 1908. Serial No. 447,129.

*To all whom it may concern:*

Be it known that I, DANIEL W. SHIEK, a citizen of the United States, residing at Indianapolis, in the county of Marion and State of Indiana, have invented certain new and useful Improvements in Calculating and Listing Machines, of which the following is a description.

My invention relates to that class of devices known as adding or computing machines wherein computations may be accurately performed mechanically by the manipulation of the proper keys or levers of the machine, and one wherein the operation of listing may also be performed, that is, a permanent record of the keys manipulated may be produced by the machine so that if desired the several operations may be checked to insure their accuracy.

The object of my invention is to produce a machine that will be absolutely accurate and exact in its operation and which may be easily and readily controlled to perform its various functions, and one which will be simple, durable and compact and not liable to accidental disarrangement rendering the same wholly or partially inoperative or inaccurate.

To this end my invention consists in the novel construction, arrangement, and combination of parts herein shown and described, and more particularly pointed out in the claims.

Figure 6:
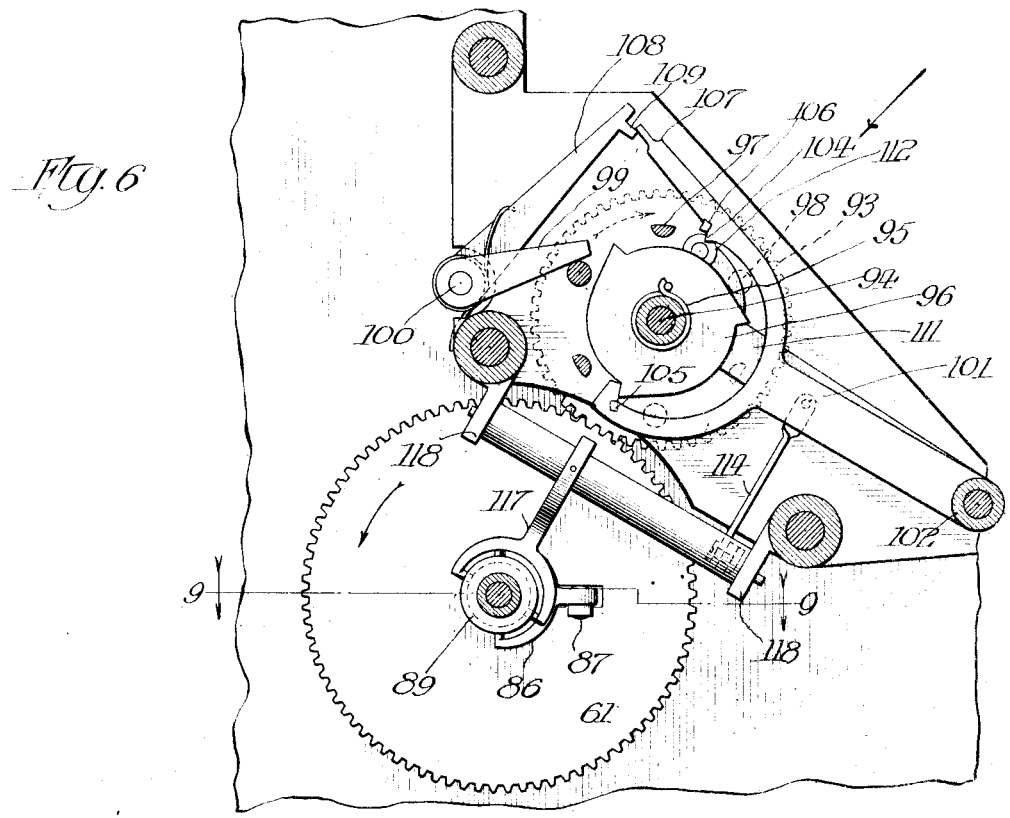
Figure 5:
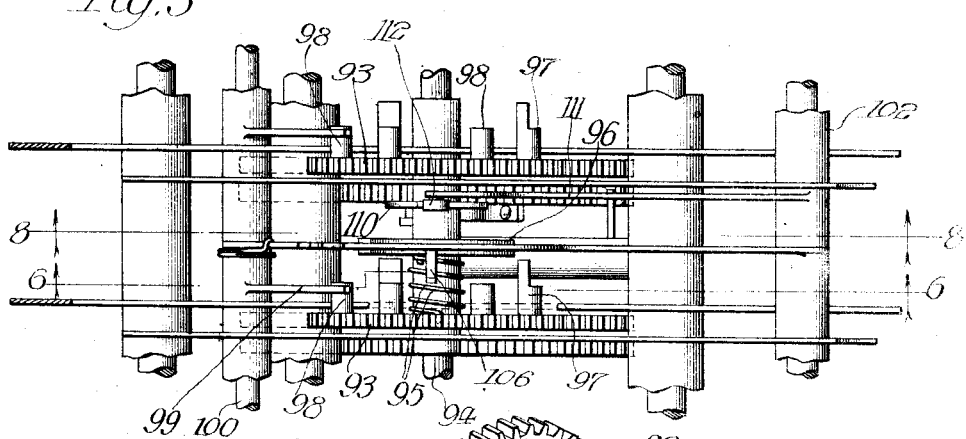
Figure 27:
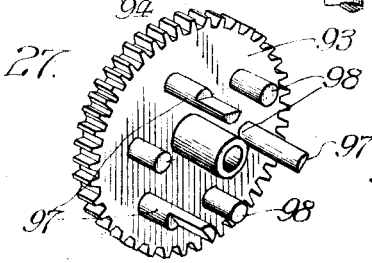
Figure 11:
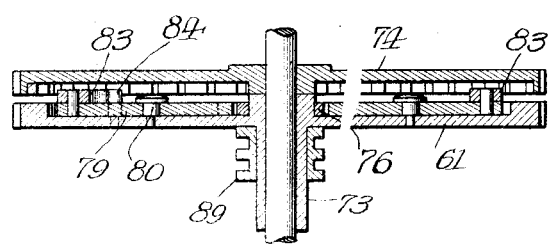
Figure 12:
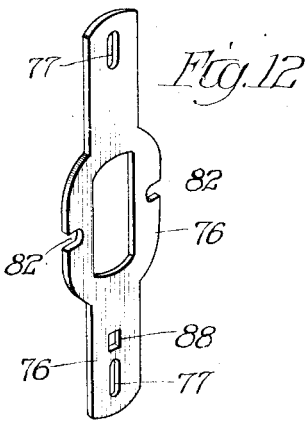
Figure 10:
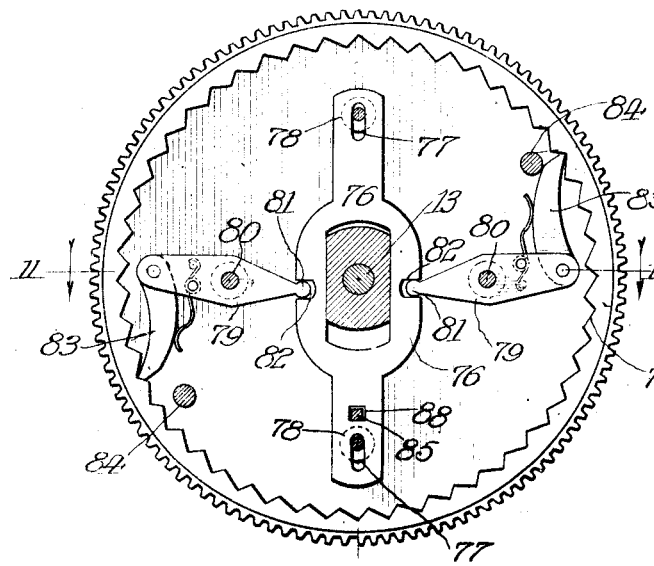
Figure 9:
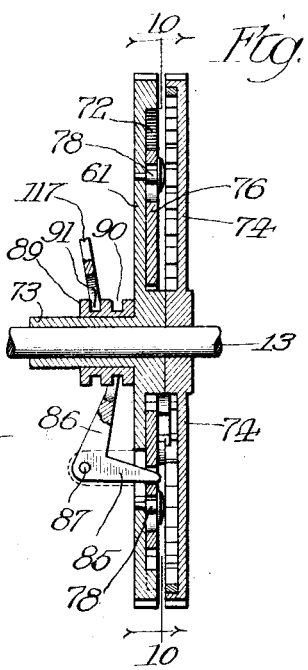

In the accompanying drawings, wherein like or similar reference characters indicate like or corresponding parts; Figure 1 is a side elevation of my machine arranged for listing with parts removed and broken away to more clearly show the construction. Fig. 2 is a view of my machine taken from the opposite side with parts broken away to more clearly show the construction. Fig. 3 is a vertical longitudinal section of the computing mechanism of my device showing the positions of the various parts when one of the keys is depressed. Fig. 4 is a view similar to that shown in Fig. 3, showing the various parts in the positions they occupy after the key initially depressed has been released. Fig. 5 is an enlarged partial section showing a portion of the carrying mechanism of my device as seen from line 5—5 of Fig. 4. Fig. 6 is a section taken substantially on line 6—6 of Fig. 5. Fig. 7 is a view similar to that shown in Fig. 5, with portions of the mechanism removed to more clearly show the construction and arrangement of the remaining parts. Fig. 8 is a section taken substantially on line 8—8 of Fig. 5. Fig. 9 is an enlarged section taken substantially on line 9—9 of Fig. 6. Fig. 10 is a section taken substantially on line 10—10 of Fig. 9. Fig. 11 is a section taken substantially on line 11—11 of Fig. 10. Fig. 12 is a perspective detail of a part of the mechanism shown in Fig. 10. Figs. 13 and 14 are enlarged details of portions of the mechanism for connecting the operating keys to the computing mechanism. Fig. 15 is a section taken substantially on line 15—15 of Fig. 13. Fig. 16 is a section taken substantially on line 16—16 of Fig. 15. Fig. 17 is a section similar to that shown in Fig. 16 but showing the parts in a different operating position. Fig. 18 is a section taken substantially on line 18—18 of Fig. 16. Fig. 19 is a plan view of the listing mechanism of my device when removed from the computing mechanism. Fig. 20 is a view similar to that shown in Fig. 19 with parts removed and broken away to more clearly show the construction. Fig. 21 is a vertical longitudinal section of the listing mechanism. Fig. 22 is a view similar to that shown in Fig. 21 with the parts in printing position. Fig. 23 is a plan view of the printing mechanism with the carriage and other parts removed and broken away to more clearly show the construction. Fig. 24 is an enlarged detail elevation of a portion of the operating mechanism for connecting the listing to the computing portion of my machine. Fig. 25 is a section taken substantially on line 25—25 of Fig. 24. Fig. 26 is a sectional detail of one of the release keys and its associated mechanism. Fig. 27 is a perspective detail of a portion of the carrying mechanism. Figs. 28 and 29 are details of the total indicator actuating mechanism. Fig. 30 is a fragmentary plan view of the indicators and coöperating parts. Fig. 31 is a perspective view of the indicator controlling mechanism and the coöperating parts. Fig. 32 is a partial plan view of the computing device, showing the single keyboard employed. Fig. 33 is a front elevation of the indicating mechanism.

In the form shown in the drawings, a suitable frame 1 is provided having a slightly inclined key-board 2 and a substantially horizontal guide plate or equivalent means 3, each provided with suitable openings to receive the upper and lower ends respectively of the key shanks or stems 4 upon which the controlling keys 5 of my machine are mounted. (Figs. 1, 2, 3 and 4.)

Any desired number or arrangement of keys or levers may be provided for operating my device. As shown the controlling keys are arranged in a plurality of series, one for each numerical order within the capacity of the machine, with a key 6 common to the several series for operating the recording mechanism. (Figs. 1 to 4, 22 and 32.) Each series of controlling keys consists of a set of nine keys representing the numerals from 1 to 9 inclusive and a release key 7. (Figs. 1 to 4, 26 and 32.) The key stems 4 are preferably square or otherwise suitably formed to prevent their turning in the plates 2 and 3 and each stem is provided with two laterally projecting pins or equivalent means 8 and 9. (Figs. 3 and 4.) A bar 10 is provided for each series of keys rigidly secured in a substantially horizontal position between the keyboard 2 and the guide plate 3 and a substantially triangular plate 11 is pivotally mounted upon the bar 10 for each key in the series. (Figs. 1, 3 and 4.)

The plates 11 may be mounted upon the bar 10 in any suitable manner. As shown each plate is pivotally attached near one of its corners to the bar as at 14 with one face of the plate extending substantially horizontally and the other face extending downward past the key shank 4 with which it is adapted to coöperate. A spring 12 or other suitable means is provided arranged to tend to rotate the plate 11 upon its pivotal support 14 in a direction to depress the free end of its horizontal face. A portion of the face 15 of each plate 11 near its upper end is offset slightly providing a shoulder as at 16 adapted to engage the pin 9 upon its particular key shank when the key is in its elevated position and support the same. Any downward movement of the key when thus positioned will obviously tend to rotate its particular plate 11 in a direction to elevate the free end of its horizontal face.

In the form shown a lateral projection 18 is provided at the free end of the face 15 of each plate extending substantially at right angles to the plane of the plate. A substantially horizontal bar 19 is provided having a downwardly extending finger 20 for each plate 11 suitably positioned to engage the respective projections 18, and lock the plates against rotation, thereby positively locking all of the keys of the series whose plates are thus engaged against downward movement.

The bar 19 may be attached to the frame 1 or other stationary portion of my device in any desired manner so that it may be moved vertically to engage or disengage the plates 11 above described. In the form shown a pair of links 21—22 are pivotally attached at one end to the bar 19 near its opposite ends respectively and at their opposite ends to the bar 10. The distance between the pivotal connections of the links to the bars 10 and 19 are substantially the same so that the bar 19 will be free to move upward and longitudinally yet remaining practically parallel to its normal position. The fingers 20 are preferably inclined to substantially correspond with the direction of movement of the bar.

Any suitable means may be provided to control the movements and positions of the bar 19. In the form shown a pair of bell crank levers 23—24 and 25—26 are rotatably mounted upon the fixed shafts 27 and 28 respectively. A bar 29 is pivotally attached to, and connects, the free ends of the arms 23 and 25, and the parts are so proportioned and arranged that the bar 29 will at all times remain substantially parallel to its normal position. The free ends of the arms 24 and 26 are also preferably pivotally connected by a rod or bar 30 so as to insure the regular and uniform parallel movement of the bar 29 as it passes the pivotal supports 27 and 28 of the bell cranks.

A spring 31 or other suitable means extends from the bar 30 to a suitable portion of the frame 1 of my machine adapted to normally maintain the bar 29 in its elevated position. An arm 32 is rigidly attached to the bar 19 and provided with a horizontal projection 33 near its upper end arranged to extend into the path of the bar 29 to move the bar 19 vertically upon a sufficient vertical movement of the bar 29. The pins 8 upon the key shanks 4 are arranged directly above and engaging the bar 29 so that the downward movement of any key in a series will carry the bar 29 of that series downward and permit of a similar movement of the bar 19. This movement of the bar 19 causes the fingers 20 to engage the parts 18 of the several plates 11, except of the particular plate 11 coöperating with the shank 4 whose movement is temporarily controlling the position of the bar 29, and lock all the keys not so depressed in their normal elevated position. The initial movement of the key temporarily controlling the parts, in its initial movement rotates its particular plate 11 sufficiently to carry its part 18 past the finger 20 adapted to coöperate therewith. The several keys and their coöperating locking parts remain in the positions above described until the key operated has completed its stroke and is returning to its normal position, when the part 33 of the bar 32 is engaged by the bar 29 and elevates the bar 19 releasing all of the keys of the series just as the key previously depressed reaches its normal elevated position. (Figs. 3 and 4.)

In the preferred construction (Figs. 3, 4 and 26) suitable means are provided for preventing the return of the parts to their normal position after an initial movement of a key, until the stroke is completed. As shown a segment 34 is pivotally mounted upon a suitable stationary portion of my device as at 35 and connected to the arm 23 of the bell cranks 23—24 or other suitable movable portion of the machine by a link 36 or equivalent means so that the movement of the segment 34 will correspond with the movements of any key in a series. A double acting pawl 37 is provided pivotally mounted as at 38 upon a suitably fixed portion of the frame and arranged to engage the curved face of the segment 34 when the same is moved, in either direction, to prevent its reverse movement until the segment has reached the limit of its movement. The length of the segment is such that when a key reaches the limit of its downward movement the pawl passes beyond the end of the segment, and engages the segment in the opposite direction while it is returning and prevents a second depression of the key until the key is fully restored to its normal position, when the pawl passes from the opposite end of the segment freeing the mechanism. Any suitable means may be provided to resiliently hold the pawl 37 in position to engage the face of the segment when moving in either direction. In the form shown an arm 39 is pivotally mounted as at 40, a lateral pin or projection 41 is provided upon the pawl 37 and a V-shaped notch or depression 42 is provided in the arm 39 adapted to engage the projection 41 and tend to resiliently hold the pawl 37 in a radial position to the segment 34. A spring 43 or other suitable means is provided to resiliently force the inclined faces of the depression 42 against the pin as above described. Suitable means are preferably provided to force the pawl 37 out of engagement with the segment 34 when it is desired to release a key before the same has completed its stroke. For this purpose, in the form shown, the shank of the release key 7 is provided with a lateral projection 43' adapted to engage the pawl 37 to hold the same out of engagement with the segment. Any suitable means may be provided for controlling the operation of my device by the movement or position of the keys 5—5. As shown a horizontally movable bar 44 is provided for each series of keys preferably positioned substantially in the plane of, and directly above, the plates 11 for that particular series. The bar 44 is provided with a plurality of shoulders or stops 45 upon its lower edge corresponding to the number of plates 11 for that particular series. Each stop is suitably formed to engage the plate corresponding to that particular stop at the free end of its horizontal face when the plate is moved by the depression of a key. The several stops 45 are so positioned in relation to the plates 11 as to permit, for each successive key in a series, a regular gradual increase in the allowed travel of the bar 44 from the shortest to the longest distance, the amount in each case being regulated by the position in the series of the particular key operated. That is to say, the distance traveled by the bar in each case depends upon the particular key operated and is regularly increased from the first or one key to the last or ninth key inclusive.

As shown the bar 44 is supported upon the frame 1 by suitable pins 46—46 rigidly secured upon the frame and loosely positioned in slots 47 in the opposite ends of the bar formed to permit the desired movement. The indicating and computing mechanism may be controlled by the bars 44 in any desired manner. As shown a lever 48 is provided for each series of keys pivotally mounted near one end upon the shaft 28 and connected by a link 49 or equivalent means to the bar 44 of its particular series. A lever 50 is also provided for each series pivotally mounted upon the shaft 28 and arranged to coöperate with the bell crank 25—26 and lever 48, so that the movements of the bell crank will be communicated to the levers 48 and 50. The extent of the movement of both of the levers is preferably controlled by the bar 44. (Figs. 3 and 4.) Any suitable means may be provided for this purpose. As shown, Figs. 13 to 18 inclusive, the bell crank 25—26 is provided with a cylindrical boss 51 concentric with the shaft 28, and the lever 50 is provided with an opening near one end a part of which is adapted to fit the boss and with a part extending longitudinally of the lever as at 52 to receive a spring actuated tongue 53. This tongue or dog 53 in the preferred form shown in Figs. 16 and 17, has the lower end loosely but pivotally seated in a proper recess formed in the yoke 50. The free end of the tongue 53 is resiliently pressed against the circumference of the boss to operate as a clutch to frictionally engage the same to move the lever with the bell crank in one direction, and leave the parts substantially free from each other when the bell crank moves in the opposite direction. The lever 48 is preferably provided with a pin 54 or equivalent means extending into the opening 52 in position to engage with the tongue 53 whereby the lever 48 is prevented from moving with the lever 50 during the downward movement of a key. A pin 55 or equivalent means is also provided upon the bell crank arranged to engage both the levers 48 and 50 when the key and associated parts are returning to their normal positions, to return the levers and the connected mechanism into position for the next operation. A spring 56 or other suitable means is preferably provided to resiliently press the pin 55 toward the levers 48 and 50.

Two arms 59 and 60 (best shown in Fig. 31; also in Figs. 3, 4, 13 and 14) are pivotally attached to a suitable stationary portion of my device one at each side of the main driving wheel 61 of the computing mechanism as at 62 and 63, with the center of the driving wheel on a line between the points of attachment. The free ends of the arms are pivotally attached to the opposite ends respectively of a bar 58 as at 64 and 65. The distance between the points 62 and 63 and the points 64 and 65 are substantially equal. The length of the arms between their pivotal connections is preferably slightly greater than the radius of the wheel 61. A spring actuated pawl 66 (Figs. 13, 14, also 3, 4, and 31) is mounted upon the bar 58 as at 67 arranged to engage the teeth of the wheel to rotate the same at each oscillation of the bar 58 (see Figs. 13 and 14). The several parts are so proportioned and the point 67 is so positioned that when the bar 58 is oscillated the point 67 will move in a path concentric to the wheel 61. A link 57 connects the bar 58 with the free end of the lever 50 so that the position of the bar 58 in relation to the wheel 61 will be controlled by the variable movement of the lever 50 and will always correspond to the position of the lever. As shown a bell crank 68—69 is also mounted upon the bar 58 at 67 with its arm 68 connected by means of a rod or link 70 to the free end of the lever 48 and its arm 69 suitably formed to engage the teeth of the wheel 61.

When thus constructed a movement of any key in a series will rotate the bell crank 25—26 and move the levers 48 and 50 until the stop 45 upon the bar 44 corresponding to the key operated engages its plate 11, preventing a further movement of the bar. This will arrest the movement of the lever 48 when the general forward movement of the coöperating parts serves to partially rotate the bell crank 68, 69, and bring the extremity of the arm 69 into engagement with the wheel 61. A very slight further movement of the lever 50 disengages the tongue 53 from the boss 51 and prevents a further movement of the lever 50 and its associated parts permitting the key to complete its downward movement merely rotating the bell cranks 23—24 and 25—26. (Figs. 15, 16 and 17.) When the downward movement of the key is completed and it is released, the bell crank 25—26 begins to return toward its normal position, and the pin 55 engages the lever 50 and moves it slightly in advance of the lever 48 thereby disengaging the arm 69 from the teeth of the wheel, so that when the pin 55 engages the arm 48 the various parts are free to return to their normal positions without rotating the wheel 61. A suitable pawl 71 or equivalent means is preferably provided to engage the wheel 61 and prevent its rotation during the return movement of the parts (Figs. 3, 4, 13 and 14).

Any suitable form of indicating and computing mechanism may be provided to coöperate with the mechanism hereinbefore described. As shown the main driving wheel 61 is rotatably mounted upon a shaft 13 and provided with suitably formed teeth evenly spaced about its periphery and adapted to be engaged to control the rotations of the wheel in either direction. In the preferred construction the mechanism is so proportioned that each tooth or a certain number of teeth on the wheel 61 represents a unit so that when a key is depressed the wheel will be rotated a number of teeth or points corresponding with the numeral which the depressed key represents, that is, for example, if the five key is depressed the main wheel 61 will be rotated five teeth or points or if the 9 key is depressed the wheel will be moved forward nine teeth or points. Obviously in a device of this character representing a number of numerical orders, it is desirable to advance the indicating and computing mechanism of each order one point each time the indicating mechanism of the next lower order is advanced ten points, in other words, it is desirable to provide means for carrying the tens to the next higher order.

In the form shown the wheel 61 is provided with a suitable annular recess 72 in one side (Figs. 9 to 12 inclusive) and a concentric sleeve 73 upon the opposite side, a gear wheel 74 preferably of the same size as the wheel 61 and preferably provided with substantially the same number of teeth upon its periphery, is mounted upon the shaft 13 at the recessed side of the wheel 61, the wheel 74 is also provided with a recess adjacent the wheel 61 and with suitable ratchet teeth 75 formed in the margin of the recess.

Any suitable means may be provided to control the movement of the wheel 74 relative to the wheel 61. As shown a yoke 76 is mounted in the recess 72 arranged diametrically of the wheel 61 and arranged to slide longitudinally, a suitable slot 77 is preferably formed near each extremity of the yoke 76 and a stud 78 is provided in each slot adapted to secure the yoke in position. Two levers 79—79 are pivotally mounted within the recess 72 upon the wheel 61 as at 80 with one end 81 of each lever loosely engaged in a suitable slot or jaw 82 provided in the yoke 76. A spring actuated pawl 83 adapted to engage the teeth 75 of the wheel 74 is pivotally attached to the free end of each lever 79 so that by reciprocating the yoke 76 the pawls 83 will alternately engage the teeth 75 thereby rotating the wheel 74 in relation to the wheel 61. A suitable stop 84 is provided upon the wheel 61 for each pawl 83, positioned to engage the pawls and limit their movement, at the same time holding the pawls firmly in engagement with the teeth 75 and preventing any overthrow of the parts. As above described it is obvious that the operation of the pawls 83 is alternate, that is, the wheel 74 will be advanced by the pawl 83 at one side of the yoke at each movement of the yoke 76 in one direction and by the pawl at the opposite side of the yoke by the movement of the yoke 76 in the opposite direction, one or the other of said pawls holding the wheels 61 and 74 locked against movement in relation to each other when the yoke 76 is at the limit of its movement in either direction.

Any suitable means may be provided for moving the yoke 76 longitudinally. In the form shown, a bell crank lever 85—86 is pivotally mounted upon the wheel 61 as at 87 with its arm 85 extending into the recess 72 and engaging a suitable opening or equivalent means 88 in the yoke. The arm 86 preferably extends toward the center of the wheel. A collar 89 is loosely mounted upon the sleeve 73 and provided with two annular grooves 90 and 91. The free end of the arm 86 is formed to engage one of the grooves, as for example, the groove 90 in the collar to control its position, so that each movement of the collar 89 longitudinally of the sleeve 73 will operate the yoke 76 and advance the wheel 74 a single point in relation to the wheel 61.

The movement of the collar 89 may be controlled in any suitable manner. As shown a gear wheel 93 (Figs. 5 and 6) adapted to mesh with the gear wheel 74 is mounted upon a shaft 94 in suitable relation to the gear wheel 74 and resiliently connected by a spring 95 or equivalent means to a ratchet wheel 96 also loosely mounted upon the shaft 94.

A plurality of pins or projections 97 and 98 are provided upon one side of the gear 93 arranged concentrically and evenly spaced from each other. These pins are preferably arranged alternately, three of each, with the outer side of the several pins adjacent the gear concentric to the gear and adapted to successively engage and oscillate an arm 99 pivotally mounted as upon the shaft 100. The pins 97 are each preferably extended beyond the pins 98 and the extended portion of each is provided with a suitable face concentric with the gear and with the body of the extended portion of the pins not extending beyond a line radial with the edges of said face. As shown these faces are formed by removing approximately the outer one half of the extended portion of each pin thus providing a face having a width substantially equal to the diameter of the pin.

A yoke 101 is pivotally mounted upon a shaft 102 with its free end bifurcated and provided with teeth 103—104 upon the forked portion adapted to engage the teeth of the ratchet wheel 96. Lateral projections 105—106 are also provided upon the arms of the yoke 101 adapted to engage the faces of the pins 97 to partially control the movement of the yoke. One arm of the yoke is extended as at 107 and arranged to be engaged by a dog 108 rigidly connected to, and adapted to be operated by, the arm 99.

In operation as the gear 93 is rotated the pins 98 will successively engage the arm 99 and move the dog 108 out of engagement with the arm 107. When this occurs the teeth upon the cam or ratchet wheel 96 and yoke 101 are formed to tend to vibrate the yoke, which action however, is temporarily prevented by the engagement of one of the teeth 105 or 106 as the case may be with the outer face of one of the pins 97 permitting only a slight movement of the yoke. While the parts are so engaged the pin 98 which is engaging the arm 99 passes beyond its end and permit the arm to fall, the slight movement of the yoke however causes the dog 108 to merely rest against the end of the extension 107 so that as soon as the pin 97 passes out of the path of the lateral projection 106 the yoke is free to move, carrying the extension 107 to the opposite side of the projection 109 of the dog 108, which immediately engages the extension 107 upon its opposite side and thereby prevents the movement of the yoke in the opposite direction, arresting the movement of the ratchet 96.

In the preferred construction shown in Figs. 4, 5, 6, 7 and 8, a cam wheel 110 having three lobes or wings is rigidly connected to the ratchet 96 and a yoke 111 preferably also mounted upon the shaft 102 and bifurcated at its free end is provided having an anti-friction roller 112 upon each arm of the forked end adapted to engage the cam 110 to control the movements of the yoke 111, thus causing the yoke 111 to complete three oscillations at each rotation of the cam 110. A rod 114 is pivotally attached to the yoke 111 as at 115 and connected near the free end to the arm 116 of a bell crank lever 116—117 pivotally mounted upon the frame of my machine in suitable bearings 118—118. The arm 117 is provided with suitable means for engaging the groove 91 in the collar 89 thus at each movement of the yoke 101 moving the collar 89 longitudinally of the sleeve 73 and advancing the wheel 74 in relation to the wheel 61 as heretofore described.

Any suitable mechanism may be provided to indicate the operation of my device. In the preferred construction shown two separate series of indicators are provided comprising two indicators for each series of keys, an item indicator 120 for showing the particular key of the series operated, and a total indicator 121 arranged to coöperate with the other total indicators of the device to show the sum of the numbers corresponding to the keys of the several series operated.

As shown, each indicator is pivotally mounted upon a shaft 122 and comprises a suitably formed segment 123 with the numerals from 0 to 9 inclusive arranged successively upon its periphery. A toothed segment 124 is rigidly attached to the item indicator. A lever 125 is loosely mounted intermediate its ends upon the shaft 62 and provided with a tooth segment at one end adapted to coöperate with the segment 124. The opposite end of the lever 125 is pivotally connected to a swinging bar 126 and is provided with a ratchet segment 127. The opposite end of the bar 126 is pivotally attached to an arm 128 loosely mounted upon a shaft 129 substantially in a common plane with the shafts 62 and 63. The length of the arms supporting the opposite ends of the bar 126 are substantially equal and the parts are so proportioned and arranged that the position of the bar 126 will at all times be substantially parallel to its normal position. A pin 130 or equivalent means is provided upon the bar 126 and an arm 131 is pivotally mounted upon the shaft 63 with a part 132 arranged in the path of the arm 60. The free end of the arm 131 is positioned to engage the pin 130 to move the bar 126 in a direction to operate the indicator, so that the movement of the bar 58 will control the movement of the bar 126 and thus the indicator 120.

In the preferred construction a spring actuated pawl 133 adapted to engage the segment 127 is pivotally mounted upon a shaft 134 and arranged to retain the indicator 120 in indicating position after the key temporarily controlling the indicator has returned to its normal position. Suitable means are also provided to disengage the pawl 133 from the segment when the next key in the series is operated.

In the form shown, each pawl 133 is provided with an arm 135 rigidly attached thereto with its free end extending into the path of a finger 136 upon the bell crank 25—26. The parts are so arranged that just as the bell crank 25—26 reaches the limit of its movement caused by the depression of a key in the series, which movement is uniform for all of the keys with which it is arranged to coöperate, the finger 136 will engage the arm 135 and retract the pawl 133 from engagement with the segment 127 leaving the indicator 123 to be moved by gravity, aided if desired by a spring or other suitable means, into a position to indicate the key last operated. Obviously as in all cases the bell crank 25—26 is partially rotated by the return movement of the keys before any other portion of the mechanism begins to return to its normal position, and the pawl 133 will be permitted to return into engagement with the segment 127 while the same is held in position by the particular key depressed so that the indicator will again be engaged by the pawl and held in indicating position until another key in the series is operated.

The movements of the total indicators 121 are each preferably controlled by the gear 74. As shown (Figs. 30 and 31) a pinion 137 is loosely mounted upon the shaft 122 and arranged to mesh with the gear 74. (Fig. 7.) A wheel having a suitable number of projecting teeth or lugs 139 upon its periphery is also loosely mounted upon the shaft 122 and rigidly connected to the pinion 137. The total indicators 121 are each loosely mounted upon the shaft 122 and provided with a spring actuated pawl 140 adapted to engage the teeth 139 of their respective wheels 138 to rotatably connect each indicator to its particular wheel.

In the preferred construction shown, a stop 141 is provided adjacent the periphery of the wheel 138 and an extension 142 is formed upon the pawl 140 adapted to engage the stop when the total indicator arrives at the desired limit of its movement to disengage the pawl from the tooth 139 of the wheel 138 temporarily controlling the position and movement of the indicator, thus permitting the indicators to drop by gravity, aided if desired by a spring or other resilient means, until the pawl engages the next tooth upon the wheel 138. Suitable stops are preferably provided to limit the movement of the indicators and rigidly support the same when released or when indicating zero. For this purpose a stop 143 is provided in the path of the lever 125 thus controlling the movement of the indicator by the position of the lever 125 to which the indicator is positively connected. A second stop as 144 may also be provided in the path of the indicators adapted to engage each indicator near its free end and thus limit their movement in that direction.

Obviously if all the indicators are simultaneously exposed considerable confusion would be liable to result, and for this reason suitable means are preferably provided for exposing only one series of indicators at a time, that is, either all of the item indicators or the total indicators as desired and concealing the other series of indicators. This may be accomplished in any desired manner, as shown a longitudinally movable plate 145 is provided in the upper face of the casing. A plurality of apertures 146 are formed in the plate 145, (Figs. 1 to 4 and 32,) one for each series of keys, and arranged to simultaneously expose all of the indicators of a series while concealing all of the other indicators. As the indicators of each series are similarly spaced, by moving the plate 145 longitudinally the width of an indicator face the indicators previously concealed will be exposed, and those previously exposed will be concealed.

Obviously at the commencement of each operation of my device it is desirable to have all the indicators canceled or in position to indicate zero. This "canceling" or "resetting" may be accomplished in any desired manner. As shown the shaft 134 upon which the pawls 133 are mounted is provided with a longitudinal slot or groove 147 and each pawl 133 is provided with a tongue 148 loosely engaging the groove 147, so that the normal movement of the pawls will merely move their respective tongues in the groove and will not rotate the shaft. When however, the shaft 134 is partially rotated in the direction indicated in Fig. 1 the wall of the groove 147 will engage the tongues 148 of all the pawls and disengage the pawls from the segments with which they are respectively engaged permitting the item indicators to fall to zero. The shaft 134 may be rotated as above described in any suitable manner. In the form shown in the drawings, a crank 149 is rigidly secured to the shaft 134 and connected by means of a rod 150 to an arm 151 pivotally mounted upon a shaft 152. A hand lever or key 153 is also pivotally mounted upon the shaft 152 with a part extending beyond the shaft and provided with a pin 154 or other suitable means adapted to engage the arm 151 when the free end of the lever 153 is depressed and rotate the arm 151 and thus partially rotate the shaft 134 and disengage the pawls as above described.

The shaft 122 is preferably arranged to control the canceling or resetting of the total indicators. In the form shown a ratchet wheel 155 is provided upon the shaft 122 for each toothed wheel 138 and a spring actuated pawl 156 is provided upon each wheel 138 adapted to engage the ratchet 155 so that by rotating the shaft 122 the several ratchet wheels 155 will engage the pawls 156 upon the wheels 138 and rotate the same until the extensions 142 of the pawls 140 engage the stop 141 thereby releasing all the total indicators from the wheels 138 permitting the same to fall to zero. A knob 157 or other suitable means is rigidly secured to the extremity of the shaft 122 for rotating the same as above described.

In the preferred construction suitable means are provided for simultaneously canceling or resetting both series of indicators. As shown (Fig. 2) an arm 158 is rigidly attached to the shaft 134 near its free end and provided with a pin 159 or equivalent means adapted to engage an arm 160 loosely mounted upon the shaft and provided at its freed end with an anti-friction roller 161 or other suitable means adapted to coöperate with a cam 162 on the shaft 122. The cam 162 is provided with a lobe or wing for each tooth 139 upon the wheel 138. The arm 160 is resiliently maintained in contact with the cam 162 by a spring 163 extending from the arm to a suitable stationary portion of the device. The several parts are so arranged that when the shaft 122 is rotated to cancel the total indicators as hereinbefore described a lobe of the cam 162 will engage the roller 161 and depress the free end of the arm 160 which will in turn engage the arm 158 and partially rotate the shaft 134 canceling the item indicators as above described.

If desired suitable means may be provided to operate an alarm or signal to notify the operator when commencing a computation that the total indicators have not been canceled as above described. In the form shown, a shaft 165 is mounted transversely of the frame of my machine with an extended arm or finger 166 for each series of keys (see Fig. 4). A ratchet wheel 167 (Fig. 2) is rotatably mounted upon the shaft 165 near one end, and a bell crank lever 168—169 is rigidly secured to the shaft in proximity to the ratchet wheel 167 and provided with a spring actuated pawl 170 adapted to engage the teeth of the ratchet to rotate the same. A latch 171 is pivotally mounted upon the machine as at 172, arranged to engage a pin 173 or equivalent means upon the arm 169 to normally hold the bell crank 168—169 in the position shown in Fig. 2.

A bell 174 or other suitable alarm device is provided, the hammer 175 of which is pivotally mounted as at 176, and provided with a finger 177 extending to the periphery of the ratchet wheel 167 and adapted to be vibrated by its engagement with the teeth thereof when said ratchet wheel is rotated. A spring 178 or other suitable means is provided and arranged to normally hold the finger 177 resiliently in contact with the periphery of the ratchet wheel.

Any suitable means may be provided to disengage the latch 171 from the pin 173. As shown a cam or part having an inclined face 179 is provided upon the plate 145 adapted to coöperate with an arm 180 pivotally mounted upon the shaft 172 so that when the plate 145 is moved to expose the total indicators the cam 179 will partially rotate the arm 180. The latch 171 is provided with an extension 181 having a part positioned in the path of the part 180 so that when the same is moved as above described, the latch 171 will be retracted from the pin 173 permitting the arm 169 of the bell crank to drop thus carrying the pawl 170 about the wheel 168 and elevating the free ends of the arms 166. The arm 160 is provided with an extension 182 with its free end adapted to coöperate with the arm 168 of the bell crank 168—169 so that when the arm 160 is depressed by the rotation of the shaft 122 when the indicators are canceled the end of the extension 182 will engage the arm 168 and partially rotate the bell crank raising the arm 169 until the pin 173 is again engaged by the latch 171. This movement rotates the ratchet wheel 167 and vibrates the hammer 175 actuating the alarm and simultaneously restores the parts to their normal position. When however, the indicators are not yet cleared or canceled as above described the free ends of the arms 166 remain in an elevated position and a pin 183 or equivalent means upon each of the bars 29 (Fig. 4) is provided to engage the arms and force the same downward when any key in a series is operated thus rotating the shaft 165 substantially as above described and resetting the alarm mechanism, warning the operator of the machine that the indicating mechanism had not previously been properly cleared or canceled.

A suitable lever or key 184 is provided rigidly attached to the shaft 165 with its free end projecting in convenient position for partially rotating the shaft 165 to restore the alarm mechanism without canceling or resetting the indicators or operating any of the numeral keys.

Any suitable form of listing or printing mechanism may be provided to coöperate with the computing mechanism hereinbefore described, to permanently record the operations of the machine. (See particularly Fig. 33.) In the form shown a toothed segment 185 is rigidly secured to each total indicator similar to the segments 124 upon the item indicators. A lever 186 is pivotally mounted intermediate its ends upon the shaft 62, with a segment at one end adapted to coöperate with the segment 185, its opposite end is pivotally connected to a substantially horizontal bar 187 and the opposite end of the bar 187 is pivotally attached to an arm 188 loosely mounted at its opposite end upon the shaft 129. The several parts are of the same general form and construction as the corresponding parts for the item indicators. Substantially the only difference between the two mechanisms is that the bar 126 controls the movements and position of the item indicators 120 while the position and movements of the total indicators 121 control the position and movements of the bar 187. The parts are however, so proportioned that the movements of the arms 128 or 188 will exactly correspond with the movements of their respective indicators 120 and 121. The operation of the printing mechanism is controlled entirely by the positions of these arms. Any suitable form of printing mechanism may be provided and preferably mounted in an entirely separate frame 189 having parts adapted to coöperate with the frame 1 of the computing mechanism to firmly hold the two in operative relation to each other.

The printing mechanism (see Figs. 1, 2, 19, 20, 21 and 22) preferably consists of a suitable paper carriage provided with means for holding and controlling the position of the paper, the desired number of suitable type, and means for arranging and inking or otherwise effecting the same to produce the desired record, and means for operating the several parts to produce the impression when desired. As shown the paper carriage consists of two substantially parallel bars or ways 190—191 rigidly connected at suitable intervals by cross pieces 192—193—194. A roller 195 is rotatably mounted between the cross pieces 192 and 193 upon a shaft 196 provided at one end with a knob 197 or equivalent means to rotate the roller to adjust the position of the paper. A ratchet wheel 198 is rigidly attached to the shaft 196 and arranged to coöperate with a suitable pawl 199 upon the cross piece 193 or other suitable means arranged to control the direction of rotation of the roller 195, preferably insuring its rotation in the direction indicated in Fig. 21. A pair of arms 200—200 are pivotally attached at one end to the cross pieces 192 and 193 respectively, and at their opposite ends are connected by a roller 201 adapted to contact with the roller 195 to engage the paper between the rollers. A guide 202 is rigidly secured to the cross pieces 192 and 193 and formed to direct the paper between the rolls 195 and 201. Suitable springs 203 or equivalent means are provided to resiliently press the roller 201 against the roller 195. A suitably formed guide 204 is also provided between the cross pieces 192 and 193 extending longitudinally of the roller, and arranged to receive the paper after passing between the rollers 195 and 201, and control its position.

The guide 204 is preferably positioned immediately below and suitably spaced from the roller 195, and an impression bar 205 having a face 206 preferably of comparatively hard rubber or other suitable resilient material is positioned in the space between the bottom of the roller 195 and the guide 204, adapted to periodically press against the paper as it leaves the guide and force the same against the type. The impression bar 205 is rigidly mounted at its extremities upon the arms 207 of similar bell cranks 207—208 pivotally attached as at 209 to the cross pieces 192 and 193 respectively. The free ends of the arms 208 are preferably connected by means of a shaft or bar 210 so that the bar 210 may be engaged at any point intermediate its ends to control the movements of the impression bar 205. After passing the guide 204 the paper is carried upward into contact with the roller 195 and held in its proper relation thereto by means of a portion of the feeding mechanism. This portion of the feeding mechanism comprises a pair of rollers 211 each mounted upon a substantially vertical, and vertically movable, bar 212 connected at their upper ends by a rod 214. Suitable springs or equivalent means 215 are provided to resiliently hold the rollers 211 in contact with the roller 195. The lower ends of the bars 212 are each pivotally mounted upon the free end of the arms 216 respectively which are in turn connected at their opposite ends to a shaft 217 pivotally mounted upon the frame 189. A suitable ratchet and pawl 218—219 is provided for each of the rollers 211 to prevent their rotation in the same direction as the roller 195, that is, so that the rollers 211 may each freely rotate in the direction indicated in Fig. 21, but cannot rotate in the opposite direction. By this means when the bars 212 are moved vertically the rollers 211 which are preferably formed of rubber or other suitable material, will coöperate with the roller 195 to frictionally engage the paper and rotate the roller 195 and move or feed the paper upon the carriage. When the bars 212 are moved in the opposite direction the rollers 211 will freely rotate without moving the paper or the roller 195. When they are again elevated the same operation will take place thus feeding the paper a certain fixed distance depending upon the extent of their travel at each upward movement of the bars 212.

The paper carriage may be mounted upon the frame 189 in any suitable manner, preferably so that the same may be moved longitudinally to record the operation of the computing mechanism upon any part of the paper, that is, to provide for arranging the figures in separate rows or columns. As shown a plurality of suitable rollers 220 are loosely mounted upon the frame 189 with the periphery of each formed to engage the bar 191 to receive the weight of the carriage and permit its free longitudinal movement. A clip or retaining bracket 221 is provided to lie in close proximity to the upper forward face of the bar 191 and prevent its ready displacement from the rollers 220. The bar 190 is preferably engaged by a suitable guide 222 adapted to engage both sides and the outer edge of the bar as shown in Figs. 21 and 22.

Suitable means are preferably provided for controlling the longitudinal position of the paper carriage. In the form shown a rod 223 is slidably mounted upon the cross pieces 192—193—194 and provided with a groove or key-way in one side, and a cam or eccentric 224 is mounted upon the rod 123 with a suitable feather or equivalent means extending into the key-way and adapted to move longitudinally upon the rod. A pair of arms 225 are rigidly secured to the frame 189 as for example by means of the bolt 226 passing through the stationary plates 227—228 with the distance pieces 229—229 on opposite sides of the arms to control their position. The ends of the arms 225 loosely embrace the shaft 223 and are suitably spaced from each other to receive the cam 224 between them and prevent any movement of the cam in relation to the frame longitudinally of the shaft. A pin 230 or other suitable means is provided extending between the arms 225 adapted to be engaged by the cam or eccentric 224 when the same is suitably positioned to frictionally engage the arms and associated parts with the shaft 223, thus positively locking the shaft in position in relation to the frame. The shaft 223 is preferably movable longitudinally of the carriage and provided with a stop 231 adapted to move longitudinally of the shaft with suitable means for clamping the stop in position upon the shaft when desired. An arm 232 provided with a part adapted to engage the key-way in the shaft 223 is mounted upon the shaft and so formed that when the free end of the arm is moved longitudinally of the shaft it will cramp and rigidly engage the shaft in the well known manner and be firmly held against longitudinal movement. A cam or inclined face 233 is provided upon the cross piece 194 to engage the free end of the arm 232, and a knob 234 is provided upon one end of the shaft 223 for conveniently rotating the same. When thus arranged it is obvious that the shaft 223 may be locked in any desired position after which by setting the stop 231 at the desired point the carriage may be moved longitudinally to the stop, after which by slightly rotating the shaft to release its engagement with the arms 225 the shaft may move longitudinally and again be clamped in position by a slight rotation thus permitting a succession of accurately measured longitudinal movements of the carriage corresponding with the desired distance between the several columns of figures. Any desired number, form, or arrangement of type may be provided for recording the operations of my device. As shown a segment 235 is provided for each series of keys with a type 236 mounted at the periphery of the segment for each key of the series. The several types are preferably arranged consecutively embracing all the numerals from 0 to 9 inclusive.

Each of the segments 235 is rotatably mounted upon a shaft 236 and provided with an extension 237 rigidly attached to the segments by which the same may be controlled. The free ends of the extensions 237 for the two central segments (see Fig. 23) are each preferably connected by rods 238 or equivalent means to the arms 239 of similar bell cranks 239—240 each pivotally mounted upon a shaft 241. The extension 237 of each of the other segments is preferably rigidly connected by a rod 242 to a lever 243; both ends of the rod 242 being rigidly secured to each. The opposite end of each of the levers 243 is connected by a rod 238' to a bell crank 239—240 upon the shaft 241 as above described. The several parts are so arranged that a given movement of any of the bell cranks 239—240 will move the segments to which they are respectively connected an equal amount and the movement of any of the segments will not in any manner conflict, or interfere, with the movements of any of the others.

Ink or other suitable material to produce the desired impression upon the paper may be applied to the type 236 in any desired manner. As shown, an ink roller 245 preferably formed of felt or similar material is provided for each segment and rotatably mounted near the end of an arm 246 which is rigidly secured to a shaft 247. A lever 248 is also rigidly secured to the shaft 247 with its free end extending downward and connected by a spring 249 or equivalent means to a suitable portion of the frame to resiliently tend to hold the ink roller in contact with the type faces.

Any suitable means may be provided for operating the recording mechanism. In the form shown, the frame 189 is extended as at 250 to serve as a base for the frame 1 of the computing mechanism and the operating key 6 is positioned transversely across the front portion of the computing mechanism. The key 6 is provided at each end with a downwardly extending stem 251 connected by links 252—253 to the extension 250. The link 252 merely serves as a guide to assist in controlling the vertical position of the key and is pivotally connected at one end to the key 6 and at the other to the frame 250. A pin 254 or equivalent means is provided on the link 252 adapted to cooperate with a cam face 255 upon the arm 256 of a bell crank 256—257 pivotally mounted upon the shaft 252. The arm 267 of the bell crank is provided with a pin 258 or equivalent means arranged to engage the lever 153 so that when the key 6 is depressed the pin 254 will engage one side of the cam face 255 and partially rotate the bell crank without producing any operation of any of the other mechanism. When however, the key 6 is released the return movement of the parts brings the pin 254 into engagement with the opposite side of the cam 255 moving the bell crank in the opposite direction causing the pin 258 to engage the lever 153 and partially rotate the same thus "concealing" or "re-setting," the item indicators of the mechanism. The arm 253 is pivotally attached to the lower extremity of the extension 251 and at its opposite end is rigidly connected to a rotatable shaft 259 extending transversely of the machine. A lever 260 is also rigidly connected to the shaft 259 and connected by means of a rod 261 or equivalent means to the free end of a crank 262 rigidly attached to a rotatable shaft 263. The free end of the lever 260 is preferably slotted so that the pivotal connection 264 between the lever and the rod 261 may be adjusted longitudinally of the lever to vary the movement of the arm 262. A pin 265 or equivalent projecting means is provided upon the rod 261 adapted to engage an arm 266 rigidly attached to a shaft 267 so that when the key 6 is operated the downward movement will partially rotate both the shafts 263 and 267, and the return movement of the key will permit the shafts to return to their normal position and at the same time "cancel" or "re-set" the item indicators of the computing mechanism. A plurality of arms 268 are rigidly secured to the shaft 263 one for each series of keys upon the computing mechanism. The free end of each arm is connected by means of a spring 269 or other resilient means to a lever 270. The arm 268 and lever 270 are also connected by means of a rod 271 preferably having a slot 272 to receive a pin 273 or equivalent means upon the free end of the arm 268 so that when the shaft 263 is partially rotated the pin 273 will be free to move longitudinally of the bar 271 in the slot 272, the spring 269 resiliently tending to correspondingly move the lever 270. When however, the parts are returned to their normal positions by the springs 325 each attached at one end to an arm 286 and at their other end to a suitable portion of the frame 198, the pin 273 engages the end of the slot and forces the lever 270 back to its normal position. The lever 268 is also connected by means of a bar 274 to the arm 275 of a bell crank 275—276. The arm 276 is adapted to engage the shaft 210 controlling the movements of the impression bar 205 so that when the shaft 263 is rotated the impression bar 205 will be brought into contact with the paper. A pin 277 or equivalent means is provided upon the arm 276 adapted to engage an arm 278 rigidly connected to the arm 216 for controlling the movement of the feed rollers 211, a spring 320 is preferably provided extending from the arm 278 to a convenient portion of the frame to normally hold the arms 212 in an elevated position.

Any suitable means may be employed to control the operation of the several parts of the printing mechanism. As shown a bar 279 is provided for each series of keys pivotally attached at one end to the lever 270 and at a point intermediate its ends to the arm 240 of the bell crank 239—240 leaving one end of the bar 279 free and extended in a horizontal position beyond the frame 189 and adapted to extend into the frame 1 of the computing mechanism. The function of the bar 279 is to control the type segment 235 as it is obvious that when the shaft 263 is rotated the bars 279 will be resiliently moved to rotate the segments 235 thereby bringing the type 236 successively into position to coöperate with the impression bar to engage, and produce an impression upon, the paper. If however the movement of the bar 279 is arrested it is obvious that the movement of the segment connected therewith will also be stopped at a corresponding point, and by arresting the movement of the bar 279 at the proper points any type upon the segment may be brought into operative relation with the impression bar. For this purpose pins 280—281 are provided upon the proximate faces of the arms 128 and 188 respectively and the bar is so positioned that when the parts are in their normal positions the end of the bar when moved by a partial rotation of the shaft 263 will engage the pin 280 upon the arm 128 controlling the movements of the item indicator thereby moving the segments 235 to correspond with the position of the item indicators of the various series of keys. When however the slide 145 is moved to expose the total indicators a part 282 upon the slide engages a lever 283 pivotally mounted upon the frame of my machine and connected at its free end to the shaft 129, and moves the shaft longitudinally carrying the arms 128 and 188 therewith and moving the pin 180 for each series of keys out of the path of the bar 279 and substituting the pin 281 upon the arm controlled by the total indicator so that when the slide 145 is in position to expose the total indicators the segments 235 will also be operated to print the characters indicated by the several total indicators. The above described movement of the shaft 129 and arms 128 and 188 also moves the bar 126 laterally sufficiently to carry the pin 130 out of the path of the arm 131 so that while the parts are in this position the item indicators will not be operated by the depression of any of the operating keys.

Obviously as above explained, in case a key of any series near the center of the machine is operated ciphers will be printed both to the right and to the left of the numeral indicating the key operated and while it is desirable that ciphers should be printed to the right of the key operated, those to left, if printed would tend to introduce confusion and possibly cause errors in the employment of the list produced. To avoid this difficulty suitable means are provided to prevent the operation of the printing mechanism for each series to the left of any series in which a key is operated. As shown a shaft 283 is mounted transversely of the machine and a plurality of arms, one for each series of keys is rotatably mounted upon the shaft, and extend into a position to coöperate with the bars 279 respectively. A part 285 is provided near the end of each arm positioned in the path of the bar 279, so that when the arm is in the position shown in Fig. 4 the part 285 will engage the end of the bar 279 and prevent its longitudinal movement and the operation of the printing mechanism. Each arm 284 is also provided with a lateral projection 286 extending to and engaging the next arm 284 to the left so that when an arm 284 for any series is raised to move the part 285 out of the path of the bar 279 the lateral projection 286 of the next adjacent arm to the right will be engaged and raise the arm to which it is attached thus simultaneously raising all of the arms to the right of the arm corresponding to the particular key operated, while all of the arms to the left of that series will not be disturbed.

In the preferred construction an arm 287 is also provided upon the shaft 283 for each arm 284 adapted to engage a pin 288 or equivalent means upon its particular arm. The arms 287 also extend into a position to engage either the pin 280 or 281 upon the arm 128 and 188 respectively when the indicators with which the arms are engaged are "canceled" or indicating zero. The arms 287 are so formed however, that as soon as any indicator is moved from the zero position, the pin above referred to for that indicator will be moved out of engaging position. A spring 289 is provided for each arm 287 with one end suitably attached to a stationary portion of the frame and the other engaging the arm 287 to hold the free end of the same in an elevated position, and the arm 284 coöperating therewith out of the path of the bar 279. A suitable jaw or shoulder 290 is provided upon each arm 287 and a pin 291 or other suitable means is provided upon the shaft 283 adapted to engage the shoulder 290 so that by a slight rotation of the shaft 283 all of the arms 287 mounted thereon may be depressed permitting the arms 284 to fall by gravity aided if desired by suitable springs or equivalent means into position to control the movement of the bar 279.

Any suitable means may be provided to control the position of the shaft 283. In the form shown an arm 292 is rigidly secured to the shaft and provided with an anti-friction roller 293 or other suitable means at its free end, a pin or projection 294 being also provided upon the arm 292 and a suitable hook or latch 295 being provided to engage the pin 294 to normally hold the arm 292 depressed. A part 296 is pivotally mounted upon the latch 295 and arranged to engage a pin 297 or other suitable means to limit its movement in one direction while leaving the same free to move in the opposite direction. A cam 298 is provided upon the shaft 267 adapted to engage the part 296 and force the latch 295 out of engagement with the arm 292, the movement of the shaft 267 for each full depression of the key 6 being sufficient to carry the projection upon the cam 298 beyond the part 296 leaving the latch 295 free to return into its engaging position. A projection or other suitable means is provided upon the extremity of the latch to limit its movement toward the pins 294 when the latch is not in engagement with the pin. When the latch 295 is disengaged as above described it is obvious that the springs 289 will partially rotate the arm 287 for each series of keys which have been operated or where indicators have been moved from the zero position and elevate the free end of each coöperating arm 284. The release movement above described occurs upon the initial movement of the key 6. As the key is further depressed an arm 299 upon the shaft 263 engages the roller 293 and forces the arm downward permitting the latch 295 to reëngage the same, in the meantime however, the bars 279 have advanced beyond the parts 285 of the arms 284 so that all of the arms 284 which have been elevated will not return to their normal position but the free end of each will rest upon its corresponding bar 279 and not interfere with the operation of the printing mechanism for that particular operation. As soon as the key 6 is released and the parts are permitted to return to their normal positions however the arms 284 will each drop by gravity into their normal positions.

In the preferred construction shown, means are provided to retract the inking rollers 245 from the faces of the type after each printing operation. For this purpose a bell crank 300—301 is pivotally mounted upon the frame 198 as at 302, with the free end of the arm 300 provided with a notch or shoulder 303 arranged to engage a pin or equivalent means 304 upon the lever 248, and a spring 305 or other suitable means is provided to hold the arm 300 in engaging position. When the shaft 263 is in normal position, the free end of an arm 306 rigidly secured to the shaft engages the arm 301 of the bell crank 300—301 and prevents engagement between the pin 304 and the shoulder 303. When the shaft 263 is rotated however, just as the key 6 reaches the limit of its downward movement the extremity of the arm 306 engages the arm 248 and moves the same so that the pin 304 is engaged by the jaw 303 thus retracting all of the rollers 245 from the type during the return movement of the parts and until the end of the arm 306 has again engaged the arm 301 and disengaged the shoulder from the pin as above described, permitting the rollers 245 to again return to contact with the type faces.

In the preferred form suitable means are provided for adjusting the operation of the paper feeding mechanism to control the distance between the numbers printed in the columns. As shown a bell crank 310—311 is rigidly mounted upon the shaft 217 with a pin or projection 312 upon its arms 310 adapted to engage the arm 378 of the paper feed mechanism and limit the downward movement of its free end. The arm 311 extends upward and is preferably provided with a pointer or finger 314 at its extremity adapted to coöperate with a suitably divided scale 315 to indicate the distance the paper will be fed at each operation of the mechanism. A clamp or bolt 317 is positioned in an opening near the free end of the arm 311 and extends through a suitably curved slot 316 in a part 318 upon the frame 189 to lock the bell crank in position. The nut upon the bolt 317 also serves as a convenient handle or knob for adjusting the position of the pointer 314.

Obviously the frames 1 and 189 may be permanently connected together if desired, but in the preferred construction shown marginal portions 320 upon the frame 189 are provided to inclose the margins of the frame 1 along their meeting faces, and any desired arrangement of pins, screws, or other connecting means 321 are provided to hold the parts in their relative positions and to rigidly connect the same so that the machine when thus positioned will operate as a unit, but providing means for detaching the frame 1 from the frame 189 if desired so that the computing mechanism may be used independently.

Having thus described my improvement, it is obvious that various immaterial modifications may be made in my device without departing from the spirit of my invention, hence I do not wish to be understood as limiting myself to the exact form and construction shown.

What I claim as new, and desire to secure by Letters Patent is:

1. In a device of the kind described, a series of keys, an item indicator and a total indicator for said keys, and means intermediate said indicators and keys for controlling the movements of said indicators by the operations of said keys, means for clearing said indicators, in combination with signal mechanism, and means for automatically operating said signal mechanism upon operating the keys to indicate whether the indicators have been cleared.

2. In a device of the kind described, indicating mechanism and registering mechanism, and a plurality of keys for operating said mechanisms, means for canceling or clearing said indicators, in combination with signaling means, and means acting automatically on each subsequent registering operation to operate said signal to indicate if the indicators have been cleared or canceled.

3. In a device of the kind described, computing, indicating and recording mechanism, and a plurality of keys for operating said mechanisms, means for canceling the indicators, in combination with a signal, intermediate mechanism between the signal and the keys, and means for automatically operating said signal to indicate whether the indicators have been canceled when the operator commences a computation.

4. In a device of the kind described, a plurality of series of indicators, mechanism for exposing a portion of each indicator of any series, and means for adjusting said mechanism to expose any series desired, in combination with a signal, and mechanism controlled by said adjusting means for operating said signal at the next movement of any of said indicators after a particular series has been exposed.

5. In a device of the kind described, a plurality of series of keys, a plurality of indicators for each series, mechanism for exposing a portion of a single indicator for each series, and means for adjusting said mechanism to expose any indicator desired, in combination with a signal, and mechanism controlled by said adjusting means for operating said signal at the next movement of any of said indicators after a particular indicator of the several series has been exposed.

6. In a device of the kind described, a plurality of series of keys, an item indicator and a total indicator for each series, mechanism for exposing either of said indicators for each series, and means for adjusting said mechanism to expose the particular indicators desired, in combination with a signal, and mechanism for operating said signal at the next movement of any of said indicators after said total indicator has been exposed.

7. In a device of the kind described, a plurality of series of keys, an item indicator, a total indicator, and recording means for each series, mechanism for exposing either of the indicators for each series, and means for adjusting said mechanism to expose either of said indicators desired, in combination with a signal, and mechanism for operating said signal at the next movement of said indicators after said total indicator has been exposed.

8. In a device of the kind described, a plurality of keys arranged to form a series, a plurality of movable members one for each series arranged to partially control the position of its key and to be moved by the operation of said keys, and a bar common to the several members adapted to engage the same to lock the keys in their elevated position, in combination with means for normally retaining said bar out of its engaging position, but releasing the same and permitting the bar to engage said members when any key in the series is operated.

9. In a device of the kind described, a plurality of keys arranged to form a series, a part common to the several keys tending to resiliently maintain all of the keys at the upper limit of their movement, a plurality of movable members, one for each key, each arranged to partially control the position of its particular key and to be moved by the operation of said key, and a bar common to the several members adapted to engage the same to lock the keys in their elevated position, in combination with means extending between said bar and said parts for normally holding said bar out of engaging position but releasing the same and permitting the bar to engage said members when any key in the series is operated.

10. In a device of the kind described, a plurality of keys arranged to form a series, a vertically movable part common to and coöperating with the several keys, resilient means tending to hold said part and all of said keys at the upper limit of their movement, a plurality of movable members one for each key, each arranged to partially control the position of its particular key, and to be moved by the operation of said key, and a bar common to the several members adapted to engage the same to lock the keys in their elevated position, in combination with means extending between said bar and said part for normally holding said bar out of its engaging position, but releasing the same and permitting the bar to engage said members when any key in the series is operated.

11. In a device of the kind described, a plurality of keys arranged to form a series, a vertically movable part common to and coöperating with the several keys, resilient means tending to hold said part and all of said keys at the upper limit of their movement, a plurality of movable members, one for each key, each arranged to partially control the position of its particular key, and to be moved by the operation of said key, and a bar common to the several members provided with a detent for each member adapted to engage the same to lock the keys in their elevated position, in combination with means extending between said bar and said part for normally holding said bar out of engaging position but releasing the same permitting the bar to engage said members when any key in the series is operated.

12. In a device of the kind described, a plurality of keys arranged to form a series, a vertically movable part common to and coöperating with the several keys, resilient means tending to hold said part and all of said keys at the upper limit of their movement, a plurality of movable members, one for each key, each arranged to partially control the position of its particular key, and to be moved by the operation of said key, and a bar common to the several members adapted to engage the same to lock said keys in their elevated position, in combination with means arranged to limit the distance between said bar and said part for normally holding said bar out of engaging position, but releasing the same and permitting the bar to engage said members when any key in the series is operated.

13. In a device of the kind described, a plurality of keys arranged to form a series, a vertically movable part common to, and coöperating with the several keys, resilient means tending to hold said part and all of said keys at the upper limit of their movements, a plurality of rotatable members, one for each key, each arranged to partially control the position of its particular key, and to be rotated by the operation of said key, and a bar common to the several members adapted to engage the same and lock the keys in their elevated position, in combination with means extending between said bar and said part for normally holding said bar out of engaging position, but releasing the same and permitting the bar to engage said members when any key in the series is operated.

14. In a device of the kind described, a plurality of keys arranged to form a series, a vertically movable part common to, and coöperating with, the several keys, resilient means tending to hold said part and all of said keys at the upper limit of their movements, a plurality of movable members, one for each key, arranged to partially control the position of the key and to be moved by the operation of said key, and a bar common to the several members provided with a detent for each member adapted to engage the same to lock the keys in their elevated position, in combination with means arranged to limit the distance between the said bar and said part for normally holding said bar out of engaging position, but releasing the same and permitting the bar to engage said members when any key in a series is operated.

15. In a device of the kind described, a plurality of keys arranged to form a series, a vertically movable part common to, and coöperating with, the several keys, resilient means tending to hold said part and all of said keys at the upper limit of their movement, a plurality of rotatable members, one for each key, each arranged to partially control the position of its particular key, and to be rotated by the operation of said key, and a bar common to the several members provided with a detent for each member adapted to engage the same to lock the keys in their elevated position, in combination with means arranged to limit the distance between said bar and said part for normally holding said bar out of engaging position, but releasing the same and permitting the bar to engage said members when any key in the series is operated.

16. In a device of the kind described, a plurality of series of keys, a toothed wheel for each series, and mechanism controlled by said keys for engaging said wheel to control its movement in either direction at each partial rotation of the wheel, to positively control the extent of its movement by the particular key of the series operated.

17. In a device of the kind described, a plurality of series of keys, a movable bar for each series, and mechanism controlled by the several keys in a series for moving and accurately controlling the movements of said bar to correspond with the particular key operated, in combination with a toothed wheel for each series, and means mounted upon said bar adapted to engage the teeth upon said wheel to rotate the same and to positively limit each rotation of the wheel by the movement of said bar.

18. In a device of the kind described, a plurality of series of keys, a movable bar for each series and mechanism controlled by the several keys in a series for moving and accurately controlling the movements of said bar to correspond with the particular key operated, in combination with a tooth wheel for each series and means mounted upon said bar adapted to engage the teeth upon said wheel to rotate the wheel in one direction at each movement of the bar and to positively limit each rotation of the wheel by the movement of said bar.

19. In a device of the kind described, a plurality of series of keys, a movable bar for each series, and mechanism controlled by the several keys in the series for moving and accurately controlling the movements of said bar to correspond with the particular key operated, in combination with a toothed wheel for each series, and a pair of pawls mounted upon said bar adapted to engage the teeth upon said wheel, one of said pawls to rotate the wheel and the other to positively limit each rotation of the wheel by the movement of said bar.

20. In a device of the kind described, a plurality of series of keys, a movable bar for each series, and mechanism controlled by the several keys in the series for moving and accurately controlling the movements of said bar to correspond with the particular key operated, in combination with a toothed wheel for each series and a pair of pawls mounted upon said bar adapted to engage the teeth upon said wheel, one of said pawls normally engaging the wheel to rotate the same and the other only engaging the wheel near the termination of the operation of said bar to positively limit the rotation of the wheel by the movement of said bar.

21. In a device of the kind described, a plurality of series of keys, a movable bar for each series, and mechanism controlled by the several keys in the series for moving and accurately controlling the movement of said bar to correspond with the particular key operated, in combination with a toothed wheel for each series, a spring actuated pawl and a mechanically controlled pawl mounted upon each of said bars adapted to engage the teeth upon said wheel, the spring actuated pawl normally engaging the wheel to rotate the same and the mechanically controlled pawl only to positively limit each rotation of the wheel by the movement of said bar.

22. In a device of the kind described, computing mechanism provided with a plurality of series of indicators, and recording mechanism having a type carrier for each indicator in a series, in combination with means for controlling the position of each type carrier by the position of the corresponding indicator in any series, mechanism for concealing the indicators of any of said series while exposing a portion of the indicators of another series, and means controlled by said concealing mechanism for changing the control of said type carriers from one series of indicators to another when desired.

23. In a device of the kind described, computing mechanism provided with a plurality of series of indicators, and recording mechanism having a type carrier for each indicator in a series, in combination with means for controlling the position of each type carrier by the position of the corresponding indicator in any series, mechanism for concealing the indicators of any of said series while exposing a portion of the indicators of another series, and means operated by said concealing mechanism for adjusting the controlling means so that any series of indicator temporarily exposed will control said type carriers.

24. In a device of the kind described, computing mechanism provided with a plurality of series of indicators, and recording mechanism having a type carrier for each indicator in a series, in combination with means for controlling the position of each type carrier by the position of the corresponding indicator in any series, a longitudinally movable slide provided with an aperture for each indicator in a series adapted to conceal the indicators of any of said series while exposing a portion of each indicator of another series, and means controlled by said slide for changing the control of said type carriers from one series of indicators to another as desired.

25. In a device of the kind described, a plurality of series of keys a plurality of series of indicators operable by said keys and mechanism for exposing a part of each indicator of a series and concealing all of the other indicators, in combination with means operated by said concealing mechanism for rendering a series of indicators inoperative when said series of indicators is concealed.

26. In a device of the kind described, a plurality of series of keys a series of item indicators and a series of total indicators operable by said keys, mechanism for concealing either of said series of indicators while exposing a portion of each indicator of the other series, and means operated by said concealing mechanism for rendering a series of indicators inoperative when the series is concealed.

27. In a device of the kind described, a plurality of series of keys, a series of total indicators and intermediate means between said indicators and keys for operating said total indicators by the movements of said keys, a series of item indicators and means operated by a part of the mechanism controlling said total indicators for operating said item indicators.

28. In a device of the kind described, a plurality of series of keys, a series of total indicators and intermediate means between said indicators and keys for operating said total indicators by the movements of said keys, a series of item indicators, and a controller positioned in the path of, and adapted to be engaged by a movable portion of said total indicator operating means for operating each of said item indicators.

29. In a device of the kind described, a plurality of series of keys, a series of total indicators and intermediate means between said indicators and keys for operating said total indicators by the movements of said keys, a series of item indicators, and a controller positioned in the path of, and adapted to be engaged by, a movable portion of said total indicator operating means for operating each of said item indicators, in combination with means for simultaneously moving all of said controllers out of engaging position thereby temporarily preventing the operation of said item indicators.

30. In a device of the kind described, a plurality of series of keys, a series of total indicators and intermediate means between said indicators and keys for operating said total indicators by the movements of said keys, a series of item indicators and a controller positioned in the path of, and adapted to be engaged by, a movable portion of said total indicator operating means for operating each of said item indicators, in combination with mechanism for concealing either of said series of indicators while exposing a portion of each of the other series, and means operated by said concealing mechanism for simultaneously moving all of said controllers out of engaging position when said item indicators are concealed thereby temporarily preventing the operation of said item indicators.

31. In a device of the kind described, a plurality of series of keys, a series of total indicators and intermediate means between said indicators and keys for operating said total indicators by the movements of said keys, a series of item indicators and a controller positioned in the path of, and adapted to be engaged by, a movable portion of said total indicator operating means for operating each of said item indicators, in combination with a longitudinally movable slide provided with an aperture for each indicator in a series adapted to conceal either of said series of indicators while exposing a portion of each indicator of the other series, and means operated by said slide for simultaneously moving all of said controllers out of engaging position when said item indicators are concealed thereby temporarily preventing the operation of said item indicators.

32. In a device of the kind described, having indicators for a plurality of numerical orders, transmitting mechanism for each order comprising two rotatable members mounted in proximity to each other, and normally engaged to operate as a unit, an idler driven by one of said members and resiliently connected to a plurality of cams, means for locking said cams against rotation, mechanism controlled by said idler for temporarily releasing said cams, in combination with means operated by one of said cams for operating the transmitting mechanism of the next higher order to advance one of said members in relation to the other.

33. In a device of the kind described, having indicators for a plurality of numerical orders, transmitting mechanism for each order comprising two rotatable members mounted in proximity to each other, and normally engaged to operate as a unit, an idler driven by one of said members and resiliently connected to a pair of cams, an arm coöperating with one of said cams for locking said cams in position, mechanism controlled by said idler for momentarily releasing said arms to permit a partial rotation of said cams, in combination with means operated by the other cam for operating the transmitting mechanism of the next higher order to advance one of said members in their relation to the other.

34. In a device of the kind described, having indicators for a plurality of numerical orders, transmitting mechanism for each order comprising two rotatable members mounted in proximity to each other and normally engaged to operate as a unit, an idler driven by one of said members and resiliently connected to a pair of cams, a pivotally mounted arm provided at each end with a yoke adapted to coöperate with one of said cams to vibrate said arm, mechanism controlled by said idler arranged to normally lock said arm against vibration and prevent the rotation of said cams, and to periodically release said arm momentarily to permit the partial rotation of said cams, in combination with means operated by one of said cams for operating the transmitting mechanism of the next higher order to advance one of said members in relation to the other.

35. In a device of the kind described, having indicators for a plurality of numerical orders, transmitting mechanism for each order comprising two rotatable members mounted in proximity to each other, and normally engaged to operate as a unit, an idler driven by one of said members and resiliently connected to a pair of cams, an arm provided at its free end with parts adapted to coöperate respectively with one of said cams to vibrate said arm and said idler to partially control said vibration, mechanism controlled by said idler arranged to normally lock said arm against vibration and prevent the rotation of said cams, and to periodically releace said arm and permit said idler to momentarily control the same and thereafter wholly release the arm to permit a partial rotation of the cams, in combination with means operated by one of said cams for operating the transmitting mechanism of the next higher order to advance one of said members in relation to the other.

36. In a device of the kind described, a series of keys, a member arranged to rotate a substantially uniform distance when a key in a series is operated, an arm mounted with said member, and friction mechanism for connecting said arm and member, in combination with means for releasing said friction mechanism and arresting the movements of said arm before said member reaches the limit of its movement.

37. In a device of the kind described, a series of keys, a member arranged to rotate a substantially uniform distance when a key in a series is operated, an arm mounted with said member, and friction mechanism for connecting said arm and member, in combination with means controlled by the particular key operated for releasing said friction mechanism and arresting the movement of said arm before said member reaches the limit of its movement.

38. In a device of the kind described, a series of keys, a member arranged to rotate a substantially uniform distance when any key in the series is operated, an arm mounted with said member and friction mechanism for connecting said arm and member, in combination with means controlled by the particular key operated for releasing said friction mechanism and arresting the movement of said arm at points corresponding to the particular key operated in each case, before the said member reaches the limit of its movement.

In testimony whereof, I have hereunto signed my name in the presence of two subscribing witnesses.

DANIEL W. SHIEK.

Witnesses:
EMILE L. SCHOPPE,
OLIVER H. CLARK.

Copies of this patent may be obtained for five cents each, by addressing the "Commissioner of Patents, Washington, D. C."